(12) United States Patent
DeHart

(10) Patent No.: US 11,341,434 B2
(45) Date of Patent: May 24, 2022

(54) SYSTEM AND METHOD FOR TIME BASED, DEMAND-PULL REAL TIME DISPATCHING

(71) Applicant: DeHart Consulting, LLC, Camarillo, CA (US)

(72) Inventor: Dale DeHart, Camarillo, CA (US)

(73) Assignee: DEHART CONSULTING, INC., Camarillo, CA (US)

( * ) Notice: Subject to any disclaimer, the term of this patent is extended or adjusted under 35 U.S.C. 154(b) by 0 days.

(21) Appl. No.: 16/573,997

(22) Filed: Sep. 17, 2019

(65) Prior Publication Data

US 2020/0027042 A1    Jan. 23, 2020

Related U.S. Application Data

(63) Continuation-in-part of application No. 15/588,084, filed on May 5, 2017, now Pat. No. 10,417,595.

(60) Provisional application No. 62/830,341, filed on Apr. 5, 2019.

(51) Int. Cl.
G06Q 10/06  (2012.01)
G06N 20/00  (2019.01)

(52) U.S. Cl.
CPC ......... G06Q 10/0631 (2013.01); G06N 20/00 (2019.01)

(58) Field of Classification Search
CPC .......................... G06Q 10/0631; G06N 20/00
See application file for complete search history.

(56) References Cited

U.S. PATENT DOCUMENTS

| | | | | |
|---|---|---|---|---|
| 11,200,540 B2* | 12/2021 | McCally | ........... | G06F 8/34 |
| 2005/0154625 A1* | 7/2005 | Chua | ........... | G06Q 10/06 |
| | | | | 700/100 |
| 2012/0159499 A1* | 6/2012 | Shafiee | ........... | G06F 9/5011 |
| | | | | 718/103 |

OTHER PUBLICATIONS

Equation1 announces issuance of patent for production dispatching solution: Vortex™ time-based, demand-pull, real-time production dispatching. (Sep. 24, 2019). PR Newswire Retrieved from https://dialog.proquest.com/professional/docview/2296041894?accountid=131444 (Year: 2019).*

* cited by examiner

Primary Examiner — Folashade Anderson
(74) Attorney, Agent, or Firm — Lewis Roca Rothgerber Christie LLP

(57) ABSTRACT

A method for managing work orders (WOs) includes: identifying connections between a server and electronic devices, each of the electronic devices corresponding to a work center (WC) of a plurality of WCs, each WC having a WO queue; and controlling production by: storing status information for a subject WC and adjacent WCs that are immediately upstream of the subject WC; identifying a next WO to be authorized for production at one of the upstream adjacent WCs based on a priority-setting rule; determining a need time until the subject WC is available to start work on the next WO; determining an arrival time until the next WO will arrive at the subject WC; and modifying the WO queue of the upstream WC to authorize the next WO at the upstream adjacent WC if the arrival time is greater than or equal to the need time of the subject WC.

6 Claims, 21 Drawing Sheets

| # | $t_{WO1, n-1}$ | $t_{T,N-1,N}$ | $t_{R,N}$ | $Q_N$ | $Y_N$ | $C_N$ | $t_{R,N-1}$ | $t_{Q,N-1}$ | $C_{N-1}$ | $t_{WO1, n-1} + t_{T,N-1,N}$ $+ t_{R,N-1} + t_{Q,N-1}/C_{N-1}$ | $t_{R,N} + (Q_N + Y_N)/C_N$ | Authorize? |
|---|---|---|---|---|---|---|---|---|---|---|---|---|
| 1 | 4 | 10 | 2 | 5 | 9 | 2 | 2 | 3 | 1 | 19 | 9 | YES |
| 2 | 6 | 10 | 2 | 5 | 9 | 2 | 2 | 3 | 1 | 21 | 9 | YES |
| 3 | 4 | 1 | 2 | 5 | 12 | 2 | 2 | 3 | 1 | 10 | 10.5 | NO |
| 4 | 4 | 1 | 2 | 5 | 12 | 2 | 2 | 5 | 1 | 12 | 10.5 | YES |

FIG. 2a

SYSTEM AND METHOD FOR TIME BASED, DEMAND-PULL REAL TIME DISPATCHING

CROSS-REFERENCE TO RELATED APPLICATION(S)

This application is a continuation-in-part of U.S. patent application Ser. No. 15/588,084, filed in the United States Patent and Trademark Office on May 5, 2017 and claims the benefit of U.S. Provisional Patent Application 62/830,341, filed in the United States Patent and Trademark Office on Apr. 5, 2019, the entire disclosures of which are incorporated by reference herein.

BACKGROUND

Since the early 1980's, the benefits of producing a given production volume throughput with the minimum amount of inventory have been well documented. Beginning with the Just-in-Time methodologies, using Kanban cards for inventory replenishment, to Demand Flow methodologies, like that posited by Suri (Paired-cell Overlapping Loops of Cards with Authorization, or POLCA) of the Quick Response Manufacturing Institute in 1998, and that patented by Costanza (U.S. Pat. No. 6,594,535) in 1999, and more recently JDA Software's patents of 2009 (U.S. Pat. No. 8,989,879) and 2015 (U.S. Pat. No. 8,965,539). See also R. Suri, "QRM and POLCA: A Winning Combination for Manufacturing Enterprises in the 21st Century," Technical Report, Center for Quick Response Manufacturing, May 2003.

A goal of production businesses is a high return on investment. Thus, if the same throughput (return) can be achieved with a smaller investment (inventory), methods of reducing inventory for a given throughput provide businesses with a competitive advantage.

The use of Kanban scheduling was championed early by Toyota Motor Company in its high volume, low variety automobile factories. Kanban cards were assigned to batches of inventory and, when consumed at a production operation, they were sent back to be replenished at an upstream operation. Using this "demand-pull" method, production at an operation would only take place with an authorizing Kanban, and this resulted in:

1. Limiting the amount of inventory in a factory to that determined by the number of Kanbans issued; and
2. Stopping production at upstream operations if production was stopped at a downstream operation. This is because the Kanbans would stop flowing upstream. The Kanbans synchronized production, enhanced quality, and reduced cost, because if a defect was found at any production operation, all production would be automatically stopped until the problem was solved.

Suri recognized in his 1998 innovation that the Kanban method does not work well in High-Complexity Production environments. Replenishment based on batches of similar units is not possible in these environments because any individual part may only be made once, or at least infrequently. To implement his push-pull system (Paired Overlapping Loops of Cards with Authorization, or POLCA), the pull-signal is based on the number of production hours that a batch of work (the Work Order, or WO) represented in its destination Work Center (WC). This normalizes all production parts based on the hours required to accomplish the work in a given WC.

POLCA has been successfully implemented and has been shown to be a solution to the high-variety production problem.

SUMMARY

Aspects of embodiments of the present invention relate to another approach to the high-variety production problem that is based on matching the Flow Time of Work Orders (WOs) to their downstream demand requirements. Some aspects of the present invention relate to a WO flow control method for a production facility having Work Centers (WCs) forming alternative flow paths for WOs, described as Time-based Demand Pull System (TDPS). TDPS employs a computer system configured for analyzing the WOs in the WCs of a production facility. The computer system includes a main computer (the Server) and individual computers for each WC, which communicate with the Server through a plurality of connections (e.g., a communications network such as a wired and/or wireless local area network and/or wide area network). The Server warehouses the system's data and programming code that provides for algorithmic control of WO demand-pull authorization. The algorithm focuses on a given WC and (1) identifies, within the queues (or work order queues) of all Upstream Adjacent (UA) WCs, the WO that should next be authorized for production based on a priority-setting rule and downstream demand (Next WO); (2) calculates the time for the Next WO to arrive at the given WC (Arrival Time); and (3) compares the Arrival Time to the time to process all the previously-authorized work ahead of the Next WO (Need Time), either in the given WC or UA to the given WC; and (4) authorizes work on the Next WO if the Arrival Time is greater than or equal to the Need Time. As an example, the priority-setting rule can be a First-in First-out (FIFO) rule wherein the WO that is not yet authorized, and arrived in its queue before all other unauthorized WOs in the UA WC queues is the Next WO.

Further definitions of terminology used in this document may be found in the Table of Definitions in Section XV.

According to one embodiment of the present invention, a method for managing time-based demand-pull production of work orders includes: identifying, by a processor at a server, a plurality of connections between the server and a plurality of electronic devices, each of the electronic devices respectively corresponding to a work center from among a plurality of work centers, each work center having a corresponding work order queue; and controlling, by the processor, production by authorizing new work orders at the work centers by: storing, by the processor, status information from the electronic devices and company databases regarding the state of the work centers, including a subject work center and adjacent work centers that are immediately upstream of the subject work center, the status information including status of work orders for the subject and adjacent work centers, capacities of the subject and upstream adjacent work centers, throughput rates of the subject and upstream adjacent work centers, lead times of the subject and upstream adjacent work centers, work in process of the subject and upstream adjacent work centers, and transit times between the subject and upstream adjacent work centers; querying, by the processor, data from a database to identify a next work order to be authorized for production at one of the upstream adjacent work centers based on a priority-setting rule; determining, by the processor, a need time including an amount of time until the subject work center is available to start work on the next work order in accordance with an amount of time to clear the corresponding work order queue of the subject work center and an amount of time to clear authorized work orders of the upstream adjacent work centers; determining, by the processor, an arrival time including an amount of time until the next work order will arrive at the subject work center if immediately authorized in accordance with one or more of: (i) an amount of time for the work in process of the upstream adjacent work center in which the next work order is located to drop below a target work in process level by the amount of work represented by the next work order; (ii) an amount of time to clear any previously authorized work orders in the corresponding work queue of the upstream adjacent work center in which the next work order is located; (iii) an amount of time needed to process the next work order through the upstream adjacent work center in which the next work order is located; and (iv) an amount of time to transit the next work order from the upstream adjacent work center in which the next work order is located to the subject work center; determining, by the processor, for each work center, in accordance with time-based demand pull authorization, whether the arrival time is greater than or equal to the need time of the subject work center; transmitting, by the processor, an authorization signal to authorize production of the next work order at the upstream adjacent work center if the arrival time is greater than or equal to the need time of the subject work center; modifying, by the processor, the corresponding work order queue of the upstream work center in response to the authorization signal; and repeating the controlling step upon a change of state of at least one work center, for repetitively generating signals to dynamically authorize the movement of work orders across multiple work centers.

The method may further include storing, by the processor, data including properties of the work orders, properties of a production item of the work orders, properties of a production environment of the work centers, properties of a labor force of the work centers, and transactional data, and training a model configured to estimate the arrival time and the need time accuracy based on the properties.

The method may further include estimating, using the trained model, the arrival time and the need time accuracy based on the properties.

The method may further include detecting a starvation condition resulting from a significant gap in arrival times of consecutive WOs by analyzing the arrival times of all WO upstream sequentially according to their relative priorities.

BRIEF DESCRIPTION OF THE DRAWINGS

The accompanying drawings, together with the specification, illustrate exemplary embodiments of the present invention, and, together with the description, serve to explain the principles of the present invention.

FIG. 2a provides examples of flow time calculations and work order authorization (in hours).

DETAILED DESCRIPTION

The Time-based Demand Pull System (TDPS) technology according to embodiments of the present invention provides an implementation of demand-pull scheduling for various production operations/systems/factories. It works in conjunction with a Material Resource Planning (MRP) or Enterprise Resource Planning (ERP) system, which creates production WOs and houses associated data, such as workflows and operational standard hours, to pull work through a factory with results similar to that of a Kanban system or POLCA.

Figure 1:
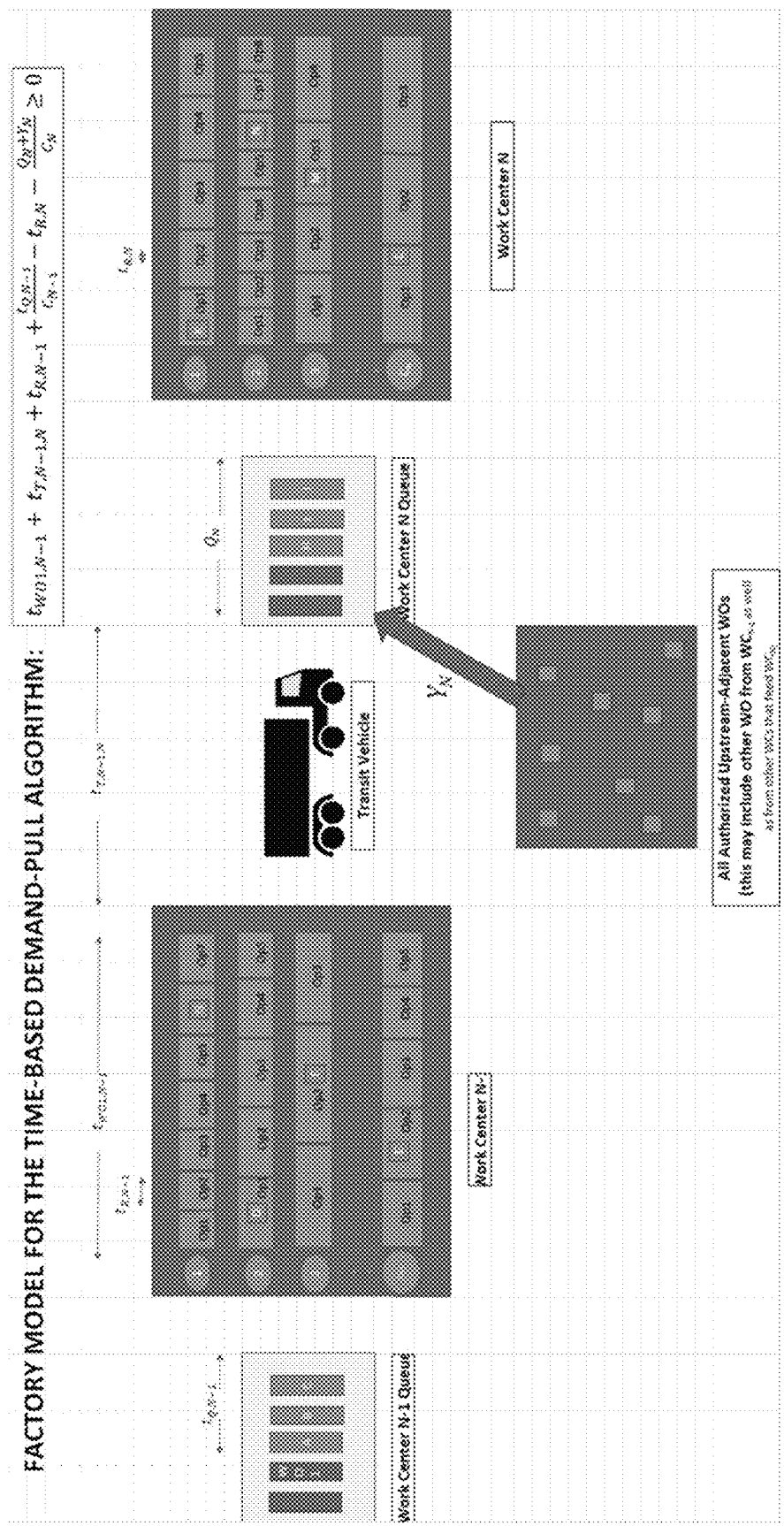
FIG. 1 is a schematic diagram of a Time-based Demand Pull System factory model.

Embodiments of the present invention will be described herein in the context of a model of a factory that includes Work Centers (WCs), within which are production operations. FIG. 1 is a schematic diagram of work orders in a Time-based Demand Pull System factory model. While the goal of TDPS is to minimize queuing, each Work Center (WC) has a corresponding queue (or work order queue) within the model. WCs are connected by the production sequences, or routings, of the work that flows through them. If one WC is connected to another through a routing, and it immediately precedes the other in the work sequence, it is referred to as being an Upstream-Adjacent (UA) Work Center (WC).

Figure 2:
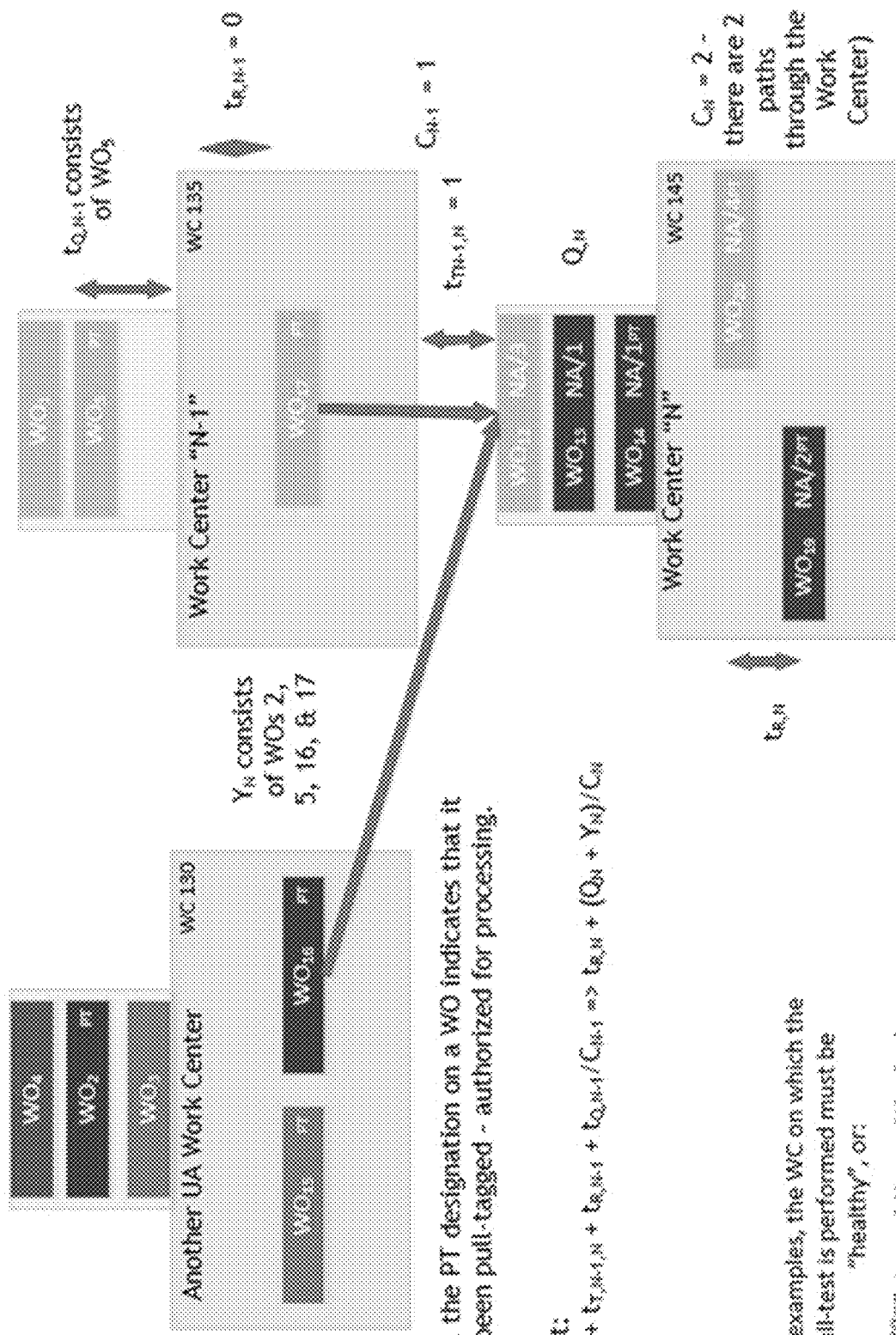
FIG. 2 is a schematic diagram of Demand-Pull Workflow timing.

FIG. 2 is a schematic diagram of Demand-Pull Workflow timing. In the example shown in FIG. 2, WCs #130 and #135 would both be considered UA for WC #145 (refer to this destination WC as $WC_N$), since work from both of these WCs flows into WC #145. In this construct, $WO_1$ can be considered to be a WO that has not yet been authorized for production in its WC (WC #135), and that has the highest priority of any WOs in any WCs that are UA to WC #145. In this case, since $WO_1$ is in the UA WC #135, WC #135 is referred to as $WC_{N-1}$.

$WO_1$ is authorized for production in $WC_{N-1}$ when the time it will take it to reach the downstream $WC_N$ once it is authorized (its Arrival Time) is equal to or greater than the time until $WC_N$ will be ready to process it (the Need Time for $WC_N$). In the case of a Balanced $WC_{N-1}$, where all operations in a WC are serial and take the same amount of time (described in more detail later), the Arrival Time for $WO_1$ is computed as the sum of the Flow Time of $WO_1$ in $WC_{N-1}$ ($t_{WO1, n-1}$) plus its transit time from $WC_{N-1}$ to $WC_N$ ($t_{T,N-1,N}$) plus the remaining Clear Time for the WO with the least remaining Clear Time of all WOs that are in the $WC_{N-1}$ first operation ($t_{R,N-1}$) [this is the time it will take for the first, currently in-process, UA WO to complete processing at $WC_{N-1}$'s first operation and trigger the start of the next WO into $WC_{N-1}$] plus the quotient of the sum of the Clear Times of all previously-authorized WOs in the $WC_{N-1}$ queue ($t_{Q,N-1}$) and the number of capacity units in $WC_{N-1}$ ($C_{N-1}$)) [this is the time required to process all the currently-authorized $WC_{N-1}$ queue through $WC_{N-1}$'s first operation and thus the time at which $WO_1$ would be started into $WC_{N-1}$].

In the case of a Balanced $WC_N$, Need Time can be modeled as the time to process the WO with the least remaining Clear Time in $WC_N$'s first operation ($t_{R,N}$) [this is the elapsed time until the next production start will take place at $WC_N$, thus pulling the next WO from the $WC_N$ queue] plus ((the sum of the $WC_N$ Clear Times of WOs in the $WC_N$ queue ($Q_N$) and the sum of the $WC_N$ Clear Times for all previously-authorized UA WOs ($Y_N$)), divided by the number of capacity units at $WC_N$ ($C_N$) [this is the time it will take to process all upstream and queued WOs through their first operation in $WC_N$, accounting for the fact that some WCs may have the capacity to simultaneously work on multiple WOs and neglecting the transit time between cell pairs]).

Or, when Equation A is satisfied:

$$t_{WO1,N-1} + t_{T,N-1,N} + t_{R,N-1} + \frac{t_{Q,N-1}}{C_{N-1}} \geq t_{R,N} + \frac{Q_N + Y_N}{C_N}$$

where all variables are specified in Section XV.

A TDPS system according to embodiments of the present invention pulls work into a downstream WC by matching the Arrival Time of the Next WO to the Need Time of its downstream WC. Need Time is the time until the downstream WC will be ready to process the Next WO, and Arrival Time is the time it will take the Next WO to reach the downstream WC once it is authorized. Matching these two values results in seamless flow and reduced inventory.

While this may be simple in concept, the complexity of work flow in high-complexity environments and the dynamic nature of their production activities, results in overwhelming execution difficulty without the aid of computing hardware and software. In more detail, computing hardware and software enable embodiments of the present invention to compute authorizations of work orders in real-time in response to the dynamic conditions of complex production environments in a manner that would be impractical or impossible to achieve by a human performing mental calculations. Accordingly, some embodiments of the present invention are directed to the use of a computer including a processor and memory, where the memory stores instructions that cause the processor to perform special purpose functions for controlling the operation of production facilities according to the techniques described herein, including a Time-based Demand Pull System (TDPS). In various embodiments, a computer system programmed in accordance with aspects of embodiments of the present invention controls a production environment by, for example, but not limited to: sending messages over a plurality of connections (e.g., computer network connections) to individual computer systems (or other electronic devices) at individual work centers to update a display of authorized Work Orders (e.g., to change the Status of a Work Order to show that it is authorized); controlling the movement of work pieces associated with Work Orders through the production environment, such as by controlling conveyor systems and robotic systems to transport work pieces between Work Centers and from staging areas to Work Centers.

Using data from an enterprise resource planning (ERP) system that is introduced into the TDPS with the WOs, as well as data that is created internally, the TDPS according to embodiments of the present invention is able to reach back from a particular WC for work from UA WCs and identify exactly which WO should be processed and when. It does this by analyzing the WOs in the queues at each UA WC, identifying the highest priority WO, computing its arrival time at the subject WC, and then authorizing the WO to be processed, if its Arrival Time at the subject WC equals (or exceeds) the time at which the subject WC will be ready to begin work on it, its Need Time. Matching the Arrival Time of the Next WO with the Need Time of its downstream WC assures that work arrives just-in-time. These techniques according to aspects of embodiments of the present invention are described in more detail below.

Production Priority-Setting Examples

There are numerous methods of setting priorities in a production environment, some of the more prevalent comparative methods are discussed below.

First-In, First-Out (FIFO)

One technique for determining the priority of authorizing work in queue at a given WC is first-in, first-out (FIFO). By this method, the priority of work is determined chronologically based on the arrival time of the WOs. The WO that arrived at the earliest time will be the next WO to be authorized for production processing.

Due-Date Slack and Critical Ratio

Another method of determining the priority of authorizing work in a queue compares the difference between the time remaining until its scheduled completion date, or due date, ($T_D$) and the time remaining in its Production Time through the remaining operations in its Workflow ($T_F$). By this method, a WO that is due to complete in five days, for example, and has five days of remaining Production Time would have a higher priority than a WO that is due to complete in five days and has three days of remaining Production Time. The logic is that the latter WO has two additional days of slack in its production schedule, while the former WO has no slack and must be processed immediately to complete on time.

The most commonly used metric for this method is "Critical Ratio" ($R_C$) and, mathematically, the Critical Ratio is calculated as follows (Equation 1):

$$R_C = \frac{(T_D - T_C)}{T_F}$$

where $T_C$ is the current time.

The highest priority WO in the system is that with the lowest $R_C$. It should be pointed out that a WO that is late (its due date is already past) will have an $R_C$<0, whereas a WO with 0<$R_C$<1 is likely to be late, and a WO with $R_C$>1 has slack in its schedule. RC=1 would represent a WO that is on track to complete on its scheduled due date.

To calculate $T_D$-$T_C$ in a production facility, one must take into account the production calendar and only consider hours that the facility is producing, these are Production-hours. For example, if today is Tuesday, and a WO is due next Monday, and the facility operates 7-days per week, then $T_D$-$T_C$=6 days, while $T_D$-$T_C$=4 days for a facility that is closed on week-ends and only operates 5-days per week.

Calculating $T_F$, one must also take into account the work schedule for each WC in the WO's workflow. Ideally, a calendar is used for these calculations, but a reasonable shortcut would be to specify the work-days for each WC and the hours per day the WC is operating. With that information, a completion date can be projected based on the WO's workflow and a direct comparison made to the WO's due date.

Expedite Policies

Another prioritization method is to assign a higher priority to WOs that are being expedited due to management policy. This may happen if the customer of the WO has paid an expedite fee, or the WO is a replacement for a previously delivered WO that failed quality or safety standards. Management may prioritize a customer's work for a myriad of reasons such as military materials during a time of war, or engineering work on an important new product. By this method, the expedited WO is always authorized for production ahead of WOs that are not being expedited.

Other Priority-Setting Scenarios

There are other settings in which certain products, or customers, may have higher priority than others. These priorities may be assigned numerically to WOs, such as a number in the range of 1 to 10 with 1 being the highest priority and 10 being lowest. In this scenario, WOs for products that are Priority-1 would receive preferential treatment and be authorized ahead of WOs with Priority-5 products.

Regardless of the system for setting priorities, for a given WC, the demand-pull system finds the highest-priority WO in its Upstream-Adjacent WCs and applies its Flow Time to Need Time comparison method to determine whether to authorize the WO for production.

III. First-Authorized, First-Processed (FAFP) Work Flow

When looking at work flow through a factory from the perspective of minimizing cycle time and honoring demand-pull policies, work is generally processed on a first authorized, first processed (FAFP) basis. Deviating from this policy can result in an increase in the average cycle time, unless batching of WOs will reduce their aggregate cycle times due to machine capacity. For an example of the latter situation, a machine may be capable of simultaneously processing ten pieces, and if there are two five-piece (or fewer) WOs, they could both be processed at the same time to reduce their aggregate cycle time, improve efficiency and maximize capacity and/or throughput.

More common examples of "jumping the queue" include changing priorities at the WC due to material shortages and preferential treatment of WOs to accommodate customer requests, management priorities or operator training. But because some WOs will spend more time in queue than they otherwise would, processing work out of chronological order is not optimal and can be counter-productive. Although the WOs that jump the queue will spend less time in queue than they otherwise would, the additional non-value-added time spent prioritizing each WO, in addition to the added time spent in the queue for WOs that are not prioritized, results in higher cycle times and more turbulent flow of the manufacturing process/operation.

Given this principle, with a pool of work to be done in a WC, it is usually desirable to work first on the WO that is first authorized, based on demand, at the WC. This would be the WO with the earliest-dated work authorization.

To enable this policy, in some embodiments of the present invention, WOs should only be started when all the requisite resources are available, that is, not started into production if a resource shortage is present. If a shortage is present, it may not be possible to process the WO with the earliest dated authorization record, which can again cause turbulence in the production flow.

IV. Calculating Flow Time in a Work Center
Using Standard Labor/Machine Processing Hours In the case where all units in a WO are processed as a discrete set, the Flow Time of a WO in a WC is equal to the Standard Process Hours of the WO. When the WO is split, by various means, however, the Flow Time will also vary accordingly. To set the stage for describing TDPS in detail, Flow Time calculation scenarios will first be discussed.

Adjusting for Serial Lot-Splitting

Figure 5:
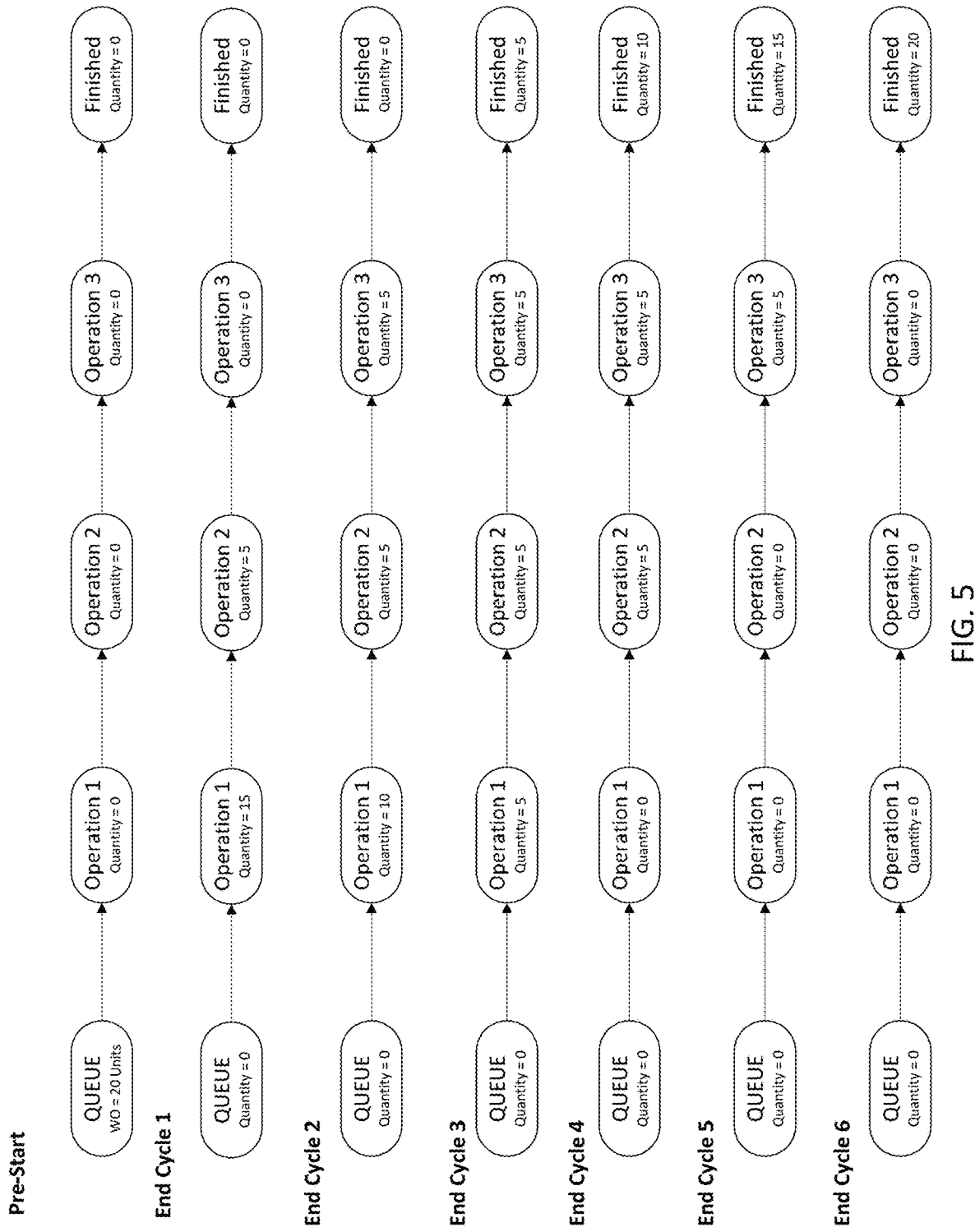
FIG. 5 is a cycle-by-cycle depiction of serial lot-splitting.

In the case where there are multiple, and serial, operations within the WC and the WO is split into multiple batches within the operations, the Standard Process Hours is adjusted to reflect the actual Flow Time. The situation is illustrated in FIG. 5 for a WO of twenty units with three serial operations within the WC and a batch size of five.

For example, a WO with a Standard Hour per Unit (HPU) of one-hour per operation, or three hours total. The total Standard Hours for this WO is then sixty hours and, if worked on at a single operation, or even moved from operation-to-operation as a single batch, the Flow Time would indeed be sixty hours. But when the WO is split into smaller batches, and moved from operation-to-operation as each batch is completed, the simultaneity of work activities will tend to compress the Flow Time. In the example shown above, each batch would move every five hours, the operation cycle-time, and the WO would complete queue-to-finished after six cycles, or just thirty hours, 50% of the Standard Hours. Thus, this Flow Time compression effect should be taken into account in the case of sequential batch-processing.

To account for the serial-lot-split case illustrated above, an adjustment to convert Standard Hours to Flow Time is applied to these factors on a WO-WC basis.

In particular, an adjustment is made and it should take the form of a ratio that can be applied to the Standard Process Hours (Equation 2):

$$R = \frac{WO_{FT}}{WO_{SH}} = \frac{\text{Flow Time}}{\text{Standard Process Hours}}$$

This ratio will vary at each WC and for each WO based on batch sizes and numbers of operations and is derived as follows:

The batch size that is processed through the WC for a WO is the quantity of units, $WO_Q$, within the WO divided by the number of batches into which the WO is to be split, $B_N$. (Equation 3)

$$B = \frac{WO_Q}{B_N}$$

In a Balanced Line, the operation cycle-time for each batch ($O_{HPB}$) is equal, or nearly equal, for all operations and is the hours per unit (HPU) for the WO divided by the number of operations, $O_N$, (to give HPU per operation) multiplied by the batch size. Expressing this in terms of a single batch gives (Equation 4):

$$O_{HPB} = \frac{HPU}{O_N} * B$$

The Flow Time, $WO_{FT}$, is the amount of elapsed time between the first batch starting at the first operation and the last batch finishing at the last operation. This can be broken up into two segments. The first segment is the amount of time that it takes to complete all batches through the first operation, which is the "Clear Time". The second segment is the amount of time it takes to complete all batches through the rest of the operations, which is the "Flush Time." Flow Time is the sum of these two times (Equation 5):

Flow Time=Clear Time+Flush Time

Clear Time can be computed as the number of batches ($B_N$) times the $O_{HPB}$ (Equation 6):

Clear Time=$t_C$=($B_N * O_{HPB}$)

or (Equation 7):

$$\text{Clear Time} = t_C = \left(\frac{WO_Q}{B} * O_{HPB}\right)$$

By substituting Equation 4 for the value of $O_{HPB}$, and Clear Time for the Balanced Line can be expressed as Equation 8:

$$\text{Clear Time} = t_C = \left(\frac{HPU * WO_Q}{O_N}\right)$$

The Flush Time is the time required for the last Batch to get though the rest of the Operations, not counting the first one since it was counted in the Clear Time, or (Equation 9):

Flush Time=$t_F$=($O_N$−1)*$O_{HPB}$

Adding the two segments together yields Equation 10:

$$\text{Flow Time} = WO_{FT} = \left(\frac{WO_Q}{B} + O_N - 1\right) * O_{HPB}$$

Alternatively, substituting from Equation 3 to yield Equation 11:

Flow Time=$WO_{FT}$=($B_N+O_N$−1)*$O_{HPB}$

The denominator of the ratio R from Equation 2, Total Standard Hours (WOW, will equal the total amount of time that each batch spends at each operation. This can be expressed as a simple multiplication of the number of batches by the number of Operations and by the Operational hours per batch (Equation 12):

$WO_{SH}=B_N*O_N*O_{HPB}$ or Equation 13:

$$WO_{SH} = \frac{WO_Q}{B} * O_N * O_{HPB}$$

Now that both the Total Standard Hours and Flow Time are represented in terms of Quantity, Number of Operations, and Batch Size the ratio between the two values can be calculated. This ratio is the conversion factor for converting Standard Hours into Flow time from Equation 2:

$$R = \frac{WO_{FT}}{WO_{SH}}$$

Substituting the results from Equation 10 and Equation 13 into Equation 2:

Equation 14:

$$R = \frac{\left(\frac{WO_Q}{B} + O_N - 1\right) * O_{HPB}}{\frac{WO_Q}{B} * O_N * O_{HPB}}$$

Equation 15:

$$R = \frac{\frac{WO_Q}{B} + O_N - 1}{\frac{WO_Q}{B} * O_N}$$

Equation 16:

$$R = \left(\frac{WO_Q}{B} + O_N - 1\right) * \left(\frac{B}{O_N * WO_Q}\right)$$

Equation 17 gives the "Flow Time Ratio" (R):

$$R = \frac{WO_Q + (B*O_N) - B}{O_N * WO_Q}$$

Example

An example follows:
Units=20; $O_N$=3; B=5; HPU=3

Using Equation 2, these values yield four (4) for the number of batches that will flow through the WC:

$$B_N = \frac{\text{\# Units}}{B} = \frac{20}{5} = 4$$

Using Equation 10, this gives a value of Total Standard Hours of sixty (60):

$$WO_{SH} = O_N * B_N * O_{HPB} = 3*4*5 = 60$$

The Flow Time, Equation 9, has a result of thirty (30):

$$WO_{FT} = (B_N + O_N - 1) * 5 = (4+3-1)*5 = 30$$

Ratio R, Equation 17, has a value of 0.5:

$$R = \frac{WO_Q + (B*O_N) - B}{O_N * WO_Q} = \frac{20*(5*3) - 5}{3*20} = 0.5$$

A simplistic visualization of the flow of batches through a WC on the right plots Operations on the horizontal with time on the vertical. The numbers symbolize the Batch number and their flow within the WC. The boxes symbolize all of the Standard Hours. Notice that if all the columns are shifted up to form a rectangle the Total Standard Hours formula becomes a simple area calculation.

|  | Operations |  |  |  |
|---|---|---|---|---|
| Normalized | 1 |  |  |  |
| Time | 2 | 1 |  |  |
|  | 3 | 2 | 1 |  |
|  | 4 | 3 | 2 |  |
|  |  | 4 | 3 |  |
|  |  |  | 4 |  |

The other key visualization here is the Flow Time. The height of the vertical axis is the Flow Time.

References to Flow Time for a WO in this disclosure refer to (Equation 18):

$$((HPU_N * \text{\# Units}) * R)$$

Adjusting for Parallel Lot-Splitting

When the number of flow paths in a WC is greater than 1, WOs may be split and run through multiple paths in the WC. This causes Flow Time to contract depending on the number of paths through which the WO is processed. When a lot is split when started, the present system first checks to validate the number of paths through which it is split versus the number of available paths in the WC and then adjusts the Flow Time based on the ratio of the largest quantity sub-lot versus the # Units in the WO, $WO_Q$ (Equation 19):

$$R_C = \frac{\text{\# Units in largest sublot}}{WO_Q}$$

In this case, R, the ratio of Flow Time to Standard Process Hours can be further generalized as Equation 20:

$$R = R_C * \frac{\text{Flow Time}}{\text{Standard Process Hours}}$$

Or, by applying Equation 17, yields Equation 21:

$$R = R_C * \frac{WO_Q + (B*O_N) - B}{O_N * WO_Q}$$

and by applying Equation 2, yields Equation 22, the "Work Order Flow Time" ($WO_{FT}$):

$$WO_{FT} = \left(R_C * \frac{WO_Q + (B*O_N) - B}{O_N * WO_Q}\right) * WO_{SH}$$

Other Lot-Splitting Cases

There are other variations and combinations of lot-splitting cases that will also result in deviations between Flow Time and Standard Process Hours. The derivations of these adjustments are not presented herein.

V. Demand-Based Production from an Arrival-Time Versus Need-Time Perspective

From a flow-time perspective, WOs should arrive in a WC's queue at precisely the time they are needed to be worked on. In other words, the Need Time of the WC should match the Arrival Time of the Next WO. This minimizes both production cycle-time and inventory investment. We will now discuss the algorithm used by TDPS to match these values and synchronize production.

Modeling Arrival Time for $WO_1$

Once authorized, the Arrival Time of $WO_1$ is the sum of:
1. the lag time between the time it is authorized until the time it is started into $WC_{N-1}$,
2. the processing Flow Time—the elapsed time necessary to complete processing in $WC_{N-1}$, and
3. the transit time from $WC_{N-1}$ to $WC_N$.

The first element, lag time, is the sum of the time until $WC_{N-1}$ will be ready to start production on the next WO in its queue ($t_{R,N-1}$) and the time required to clear any previously-authorized WOs in its queue and ahead of $WO_1$ ($t_{Q,N-1}/C_{N-1}$) since, following the FAFP rule, these would all have to clear out of the queue before $WO_1$ would be started.

Calculating $t_{R,N-1}$ and $t_{Q,N-1}$ is done differently for embodiments involving Balanced Lines versus Unbalanced Lines and this will be discussed separately in more detail.

The term $C_{N-1}$ is needed to account for the number of flow paths, or capacity units, in $WC_{N-1}$. For example, if the WC has two production lines pulling work from its queue, then the queue will clear out twice as fast as it would if there was only a single production line.

This timing can be modeled as shown in FIG. 2. $WO_1$ can be authorized when the Need Time in $WC_N$ is less than or equal to $WO_1$'s Arrival Time. Arrival Time is the sum of the Flow Time of $WO_1$ in $WC_{N-1}$ ($t_{WO1,N-1}$), plus its transit time from $WC_{N-1}$ to $WC_N$ ($t_{T,N-1,N}$) [the sum of these two values is the time it takes $WO_1$ to arrive at the $WC_N$ queue, once it is started into $WC_{N-1}$], plus the time needed to clear any currently-authorized Work Orders that are ahead of $WO_1$ in the $WC_{N-1}$ queue, which is the time until the next WO is started ($t_{R,N-1}$) plus the Clear Time content of the WOs that are ahead of $WO_1$ in the queue ($t_{Q,N-1}$).

Mathematically, this may be represented by Equation 23:

$$\text{Arrival Time} = t_{WO1,N-1} + t_{T,N-1,N} + t_{R,N-1} + \frac{t_{Q,N-1}}{C_{N-1}}$$

where $t_{WO1,N-1}$ is the "flow time," $t_{T,N-1,N}$ is the "transit time," $t_{R,N-1}$ is the "time until next start," and $$\frac{t_{Q,N-1}}{C_{N-1}}$$

is the "queue clearance time."

Modeling Need Time for $WC_N$

Need Time can be modeled as the sum of:
1. the elapsed time until the next production start will take place at $WC_N$, thus pulling the next WO from the $WC_N$ queue ($t_{R,N}$),
2. the sum of the times to clear the current WOs in the $WC_N$ queue ($Q_N$),
3. the sum of the times to consume all WOs in UA WCs that are already authorized and destined for $WC_N$ ($Y_N$)

Calculating $t_{R,N}$, $Q_N$, and $Y_N$ is done differently for Balanced Lines and Unbalanced Lines and this will be discussed separately in more detail.

Mathematically, this may be represented by Equation 24:

$$\text{Need Time} = t_{R,N} + \frac{Q_N + Y_N}{C_N}$$

where $t_{R,N}$ is the "time until next start," and $$\frac{Q_N + Y_N}{C_N}$$

is the clearance time for the queue and the upstream-adjacent work orders.

Since we will authorize the production of the Next WO when its Arrival Time is greater than or equal to its Need Time, the test for this condition is:

Arrival Time ≥ Need Time or, combining Equations 23 and 24 to yield Equation 25:

$$t_{WO1,N-1} + t_{T,N-1,N} + t_{R,N-1} + \frac{t_{Q,N-1}}{C_{N-1}} \geq t_{R,N} + \frac{Q_N + Y_N}{C_N}$$

or expressed slightly differently:

Arrival Time − Need Time ≥ 0

Equivalently, Equation 26:

$$t_{WO1,N-1} + t_{T,N-1,N} + t_{R,N-1} + \frac{t_{Q,N-1}}{C_{N-1}} - t_{R,N} - \frac{Q_N + Y_N}{C_N} \geq 0$$

Where all variables are defined in Section XV.

When this inequality is true, then the Next WO ($WO_1$) should be authorized. This is what the TDPS does by continuously monitoring the state of the factory in the context of the parameters of this equation. Some of these parameters, like the Standard Process Hours that are used to determine the Flow Times that include $Y_N$, $Q_N$, $t_{w01,N-1}$, and $t_{Q,N-1}$, come directly from the ERP/MRP system, while other parameters are continuously monitored/calculated by the TDPS to complete the algorithm and authorize WOs as appropriate for the production process.

Computing the Key Variables for a Balanced Line

A WC is described as a Balanced Line if it includes a single operation, or a set of sequential operations that have the same or similar process times. This scenario was discussed earlier and described graphically in FIG. 5.

Computing Arrival Time

In the Balanced Line scenario, the following four events need to occur for $WO_1$, our subject WO, to travel from $WC_{N-1}$'s queue to $WC_N$'s queue:
1. An existing WO (if applicable) needs to clear the first operation to trigger the next WO to be pulled for processing;
2. Any WOs in the queue that were authorized for processing prior to the authorization of $WO_1$ must clear the first operation;
3. $WO_1$ must flow through all operations in its Workflow; and
4. $WO_1$ must be moved from $WC_{N-1}$ to $WC_N$'s queue.

Note that in the Balanced Line scenario we are generally concerned with first-operation Clear Times for predicting when WOs will be pulled from the WC's queue.

These four Arrival Time event variables are calculated as follows:

$t_{R,N-1}$—the time at which the next WO will be pulled from the $WC_{N-1}$ queue—this is the remaining Clear Time of the WO with the least remaining Clear Time in $WC_{N-1}$;

$t_{Q,N-1}$—the sum of the Clear Times of all currently-authorized WOs in the $WC_{N-1}$ queue;

$t_{WO1,N-1}$—the time taken to process $WO_1$ through $WC_{N-1}$, or its Flow Time, calculated in accordance with Equation 22; and $t_{T,N-1,N}$—the time necessary to move $WO_1$ from $WC_{N-1}$ to $WC_N$.

A fifth value, $C_{N-1}$, represents the number of flow paths in $WC_{N-1}$ and is not computed, but entered administratively by operations personnel and used in the final formula (see Equation 23).

Computing Need Time

In the Balanced Line scenario, the desired time for the Next WO to arrive for processing, Need Time, is when the currently-authorized work in a WC and its UA WCs has been started into the WC and cleared the first operation in the WC routing—this is the time at which the WC will be ready to ingest the Next WO.

Need Time variables are calculated as follows:

$t_{R,N}$—the time at which the next WO will be pulled from the queue—this is the remaining Clear Time of the WO with the least remaining Clear Time in $WC_N$;

$Q_N$—the sum of the Clear Times of all the existing Work Orders in the WC queue;

$Y_N$— the sum of the Clear Times of all the existing authorized Work Orders in the UA WCs; and $C_N$— In the Balanced Line scenario $C_N$ is not computed, but entered administratively by WC operations personnel.

Sum these times to determine when these WOs will be cleared and the WC will be ready to begin processing new WOs.

Computing the Key Variables for an Unbalanced Line

Figure 14:
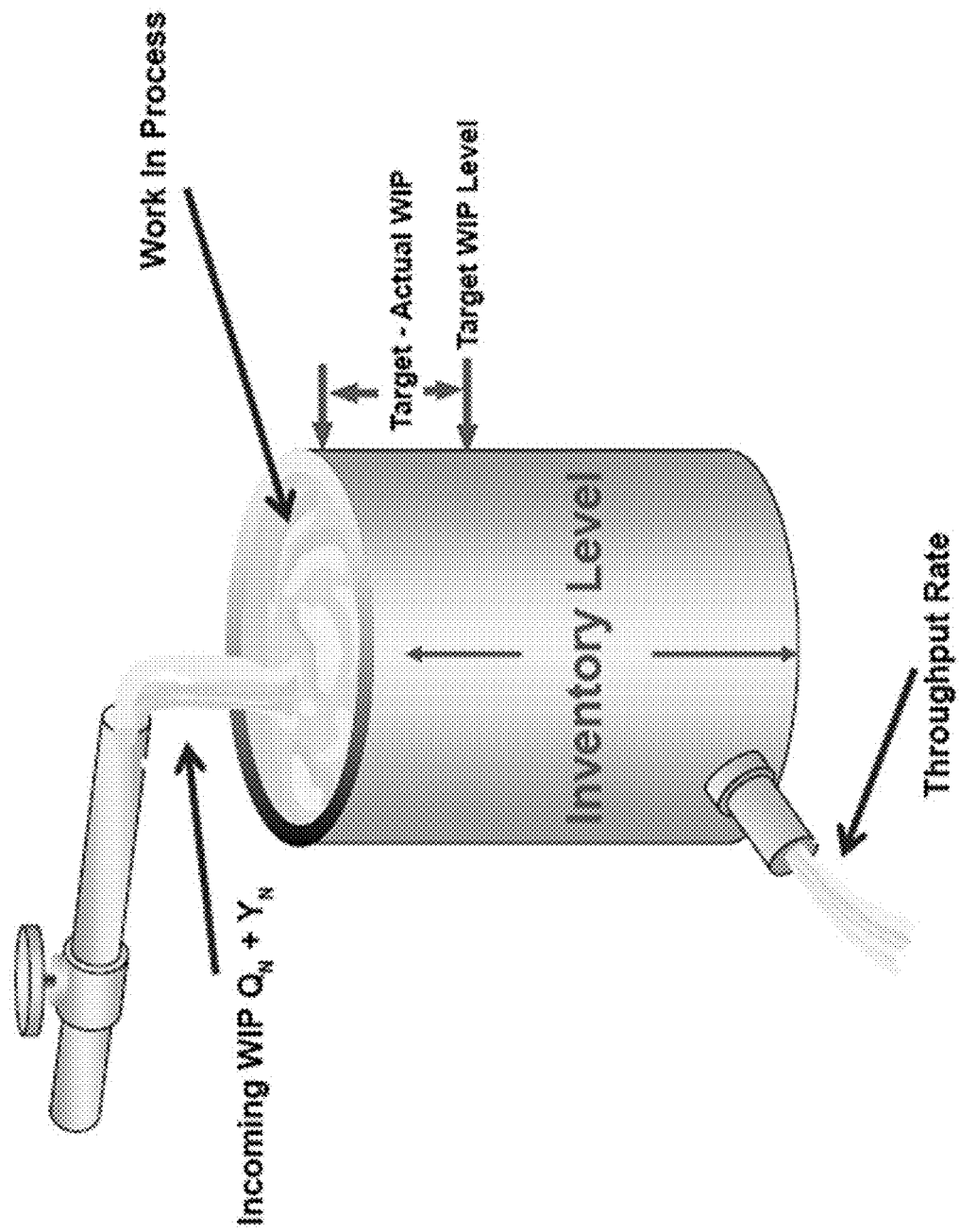
FIG. 14 is a schematic depiction of a "water tank" model of managing work-in-process (WIP) in a Work Center.

In the Unbalanced Line scenario, the goal is to maintain a fixed amount of Work-in-Process (WIP) inventory (expressed in Standard Process Hours) within the WC. Therefore, the demand-pull signal is sent upstream when the Arrival Time of the highest-priority WO ($WO_1$) equates to the time at which a deficit that is equivalent to the Standard Process Hours of $WO_1$ will occur in the actual-versus-target inventory. FIG. 14 shows an analogy to a water tank. In this flow model, the following Equation 27 applies to express equilibrium over time:

Throughput Rate*Time=$Q_N Y_N$+(Actual WIP-Target WIP)

The desired amount of WIP (Target WIP) is determined by multiplying the target Lead Time of the WC by its Throughput Rate (aka "capacity") over that period of time— this is known as Little's Law (Equation 28):

WIP=LT*TR

Where: WIP is the sum of the Standard Hours of all in-process WOs; LT is the target Lead Time of the WC in production-hours; and TR it the Throughput Rate of the WC in Standard Hours per production hour.

Each WC will set its own target WIP based on setting the target Lead Time and Capacity (Throughput Rate).

Computing Arrival Time

If the authorization attempt originates in a WC that is unbalanced, then we will first describe the Arrival Time of the highest priority UA WO ($WO_1$), assuming that $WC_{N-1}$ is also an unbalanced line. The same four events as described in the Balanced Line scenario are also required in the Unbalanced Line scenario. However, they are defined, and computed, somewhat differently:

$t_{WO1,N-1}$—the Flow Time of $WO_1$ in the same sense as in the Balanced Line approach.

$t_{T,N-1,N}$—the time necessary to move $WO_1$ from $WC_{N-1}$ to $WC_N$ $t_{R,N-1}$—Determine the lag time from the current time until the next WO is started into $WC_{N-1}$. This will be the time at which the WIP level of $WC_{N-1}$ drops below its target WIP, based on Equation 28, by an amount equal to the WIP represented by the next WO in its queue. The actual WIP will be compared to the target WIP and a projection made over time based on the Throughput Rate of the WC.

Mathematically, $t_{R,N-1}$ is the time at which Target $WIP_{N-1}$–Actual $WIP_{N-1} \geq$ Standard Hours of the next authorized WO in its queue and is computed using the model of Equation 27 as follows:

next WO Standard Hours=Target $WIP_{N-1}$–(Actual $WIP_{N-1}$–($TR_{N-1} * t_{R,N-1}$))

or

Actual $WIP_{N-1}$–($TR_{N-1} * t_{R,N-1}$)=Target $WIP_{N-1}$–next WO Standard Hours or –($TR_{N-1} * t_{R,N-1}$)=Target $WIP_{N-1}$–next WO Standard Hours–Actual $WIP_{N-1}$ or ($TR_{N-1} * t_{R,N-1}$)=next WO Standard Hours+Actual $WIP_{N-1}$–Target $WIP_{N-1}$ Where Actual $WIP_{N-1}$ is the sum of the Standard Process Hours of all in-process WOs in $WC_{N-1}$, or (Equation 29):

$$t_{R,N-1} = \frac{\left(\sum_{AllWIP} WO_{SH}\right)_{N-1} + (\text{next } WO_{SH})_{N-1} - \text{Target } WIP_{N-1}}{TR_{N-1}}$$

Also, note that this lag time, $t_{R,N-1}$, can never be negative, so a conditional clause must be included to force $t_{R,N-1}$ to 0 if the formula above results in a negative number.

Figure 16:
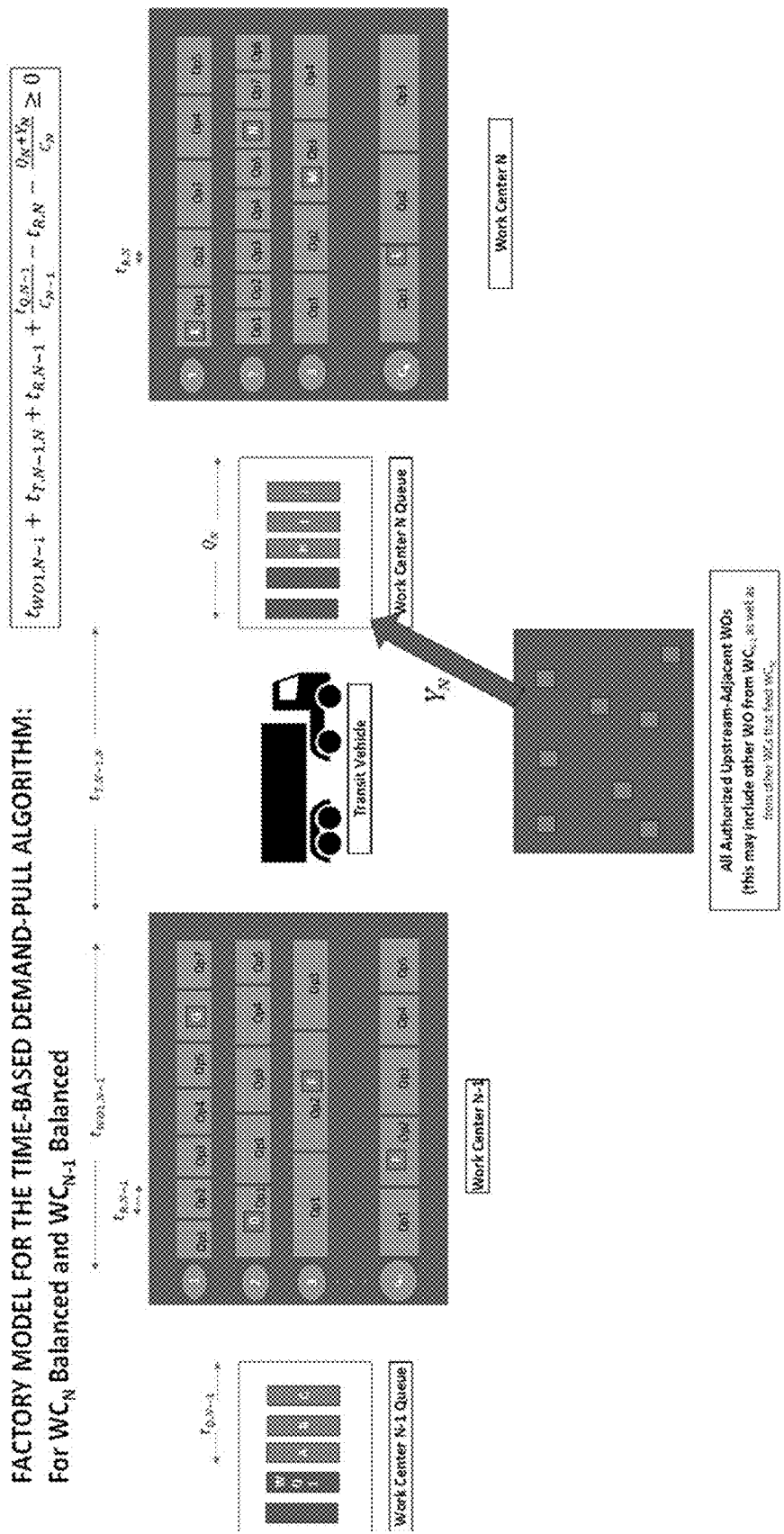
FIG. 16 is a schematic diagram of a factory model implementing a time-based demand-pull operation according to one embodiment of the present invention, where the current work center ($WC_N$) and the prior work center ($WC_{N-1}$) are both balanced.

A descriptive graph of this parameter is shown in FIG. 16.

Finally, note that since from Equation 27, Target WIP=LT*TR, $t_{R,N-1}$ can also be expressed as Equation 30:

$$t_{R,N-1} = \frac{\left(\left(\sum_{AllWIP} WO_{SH}\right)_{N-1} + (\text{next } WO_{SH})_{N-1}\right)}{TR_{N-1}} - LT_{N-1}$$

$t_{Q,N-1}$—the time over which $WO_1$ will wait for WOs ahead of it in its queue to be started, based upon the inventory in $WC_{N-1}$'s queue and the WC's Throughput Rate:

$t_{Q,N-1}$=Sum of the Standard Hours of Authorized WOs in the $WC_{N-1}$ queue divided by the $TR_{N-1}$, or (Equation 31):

$$t_{Q,N-1} = \frac{\left(\sum_{AllAuthorizedQueue} WO_{SH}\right)_{N-1}}{TR_{N-1}}$$

This will result in the number of production-hours ahead of $WO_1$ in the $WC_{N-1}$ queue $C_{N-1}$—In the Unbalanced Line scenario $C_{N-1}$ is always equal to 1, since the Throughput Rate represents the throughput of the entire WC, not an individual Line.

The above four components are summed to yield the Arrival Time result expressed in Equation 23, above.

Note that if $WC_{N-1}$ is a Balanced Line, then Arrival Time is computed in the Balanced Line method, even if $WC_N$ is an Unbalanced Line.

Computing Need Time

Need Time in the Unbalanced Line scenario is based on maintaining this fixed amount of WIP in $WC_N$. Need Time is formulated as Equation 24, but the values are computed differently than in the Balanced Line scenario.

1. The method for computing the time until the next WO is started into $WC_N$ is similar to that used in the Arrival Time discussion, Equation 29. In the case of $WC_N$ (Equation 32):

$$t_{R,N} = \frac{\left(\sum_{AllWIP} WO_{SH}\right)_N + (\text{next } WO_{SH})_N - \text{Target } WIP_N}{TR_N}$$

or Equation 33:

$$t_{R,N} = \frac{\left(\left(\sum_{AllWIP} WO_{SH}\right)_N + (\text{next } WO_{SH})_N\right)}{TR_N} - LT_N$$

However, the condition that if this formula results in a negative number, the value is forced to 0 does not apply to this parameter.

2. $Q_N$—the time required to consume the existing queue in $WC_N$ is computed in a similar manner to that of computing $t_{Q,N-1}$ in the Arrival Time discussion of Equation 31 except in the case of QN, all WOs, both authorized and not yet authorized, are counted (Equation 34):

$$Q_N = \frac{\sum_{AllQueued} WO_{SH}}{TR_N}$$

3. $Y_N$— the time required to consume all authorized WOs in UA WCs is computed in a similar manner to that of $Q_N$ (Equation 35):

$$Y_N = \frac{\sum_{AllAuthorized\ UA} WO_{SH}}{TR_N}$$

4. $C_N$— In the Unbalanced Line scenario $C_N$ is always equal to 1, since the Throughput Rate represents the throughput of the entire WC, not an individual Line.

Four Scenarios

Based on the earlier discussion, there are four possible scenarios for the relationship between $WC_N$ and $WC_{N-1}$. These four scenarios are depicted in FIGS. 16, 17, 18, and 19 and correspond to the four cases where $WC_N$ and $WC_{N-1}$ are balanced or unbalanced. For the sake of discussion, the four scenarios will be labeled as Scenarios 1-4 as follows:

|  | $WC_N$ | $WC_{N-1}$ |
| --- | --- | --- |
| Scenario 1. | Balanced | Balanced |
| Scenario 2. | Balanced | Unbalanced |
| Scenario 3. | Unbalanced | Balanced |
| Scenario 4. | Unbalanced | Unbalanced |

In these four scenarios, the variables of Equation 26 will be different. For the sake of convenience. Equation 26 is reproduced again below:

$$t_{WO1,N-1} + t_{T,N-1,N} + t_{R,N-1} + \frac{t_{Q,N-1}}{C_{N-1}} - t_{R,N} - \frac{Q_N + Y_N}{C_N} \geq 0$$

Scenario 1—Balanced $WC_N$ and Balanced $WC_{N-1}$

FIG. 16 is a schematic diagram of a factory model implementing a time-based demand-pull operation according to one embodiment of the present invention, where the current work center ($WC_N$) and the prior work center ($WC_{N-1}$) are both balanced. In this scenario, the variables of Equation 26 may be defined as follows:

$t_{WO1,N-1}$, the time taken to process $WO_1$ through $WC_{N-1}$, or its Flow Time, calculated in accordance with:

$$WO_{FT} = R_C * \left(\frac{WO_Q + (B*O_N) - B}{O_N * WO_Q}\right) * WO_{SH}$$

Where: $WO_{FT}$=WO Flow Time $R_C$=Number of units in the largest parallel-processed sub-lot divided by the number of units in the WO. Equals 1 if there are no parallel splits.

$WO_Q$=number of units in the WO

B=Batch size—the number of units in each uniform batch into which the WO is split for serial processing. Equals $WO_Q$ if there are no splits.

$O_N$=Number of discrete operations in the balanced serial workflow sequence.

$WO_{SH}$=Total standard hours for the WO in the WC.

$t_{T,N-1,N}$=the time to transit the WO from $WC_{N-1}$ to $WC_N$.

$t_{R,N-1}$=the time at which the next WO will be pulled from the $WC_{N-1}$ queue—this is the remaining Clear Time of the WO with the least remaining Clear Time in $WC_{N-1}$ $t_{Q,N-1}$=the sum of the Clear Times of all currently-authorized WOs in the $WC_{N-1}$ queue $C_{N-1}$=the number of production lines within Work Center N-1.

$t_{R,N}$=the time at which the next WO will be pulled from the queue—this is the remaining Clear Time of the WO with the least remaining Clear Time in $WC_N$;

$Q_N$=the sum of the Clear Times of all the existing authorized Work Orders in the $WC_N$ queue;

$Y_N$=the sum of the Clear Times of all the existing authorized Work Orders in the UA WCs $C_N$=the number of production lines within Work Center N.

Scenario 2—Balanced $WC_N$ and Unbalanced $WC_{N-1}$

Figure 17:
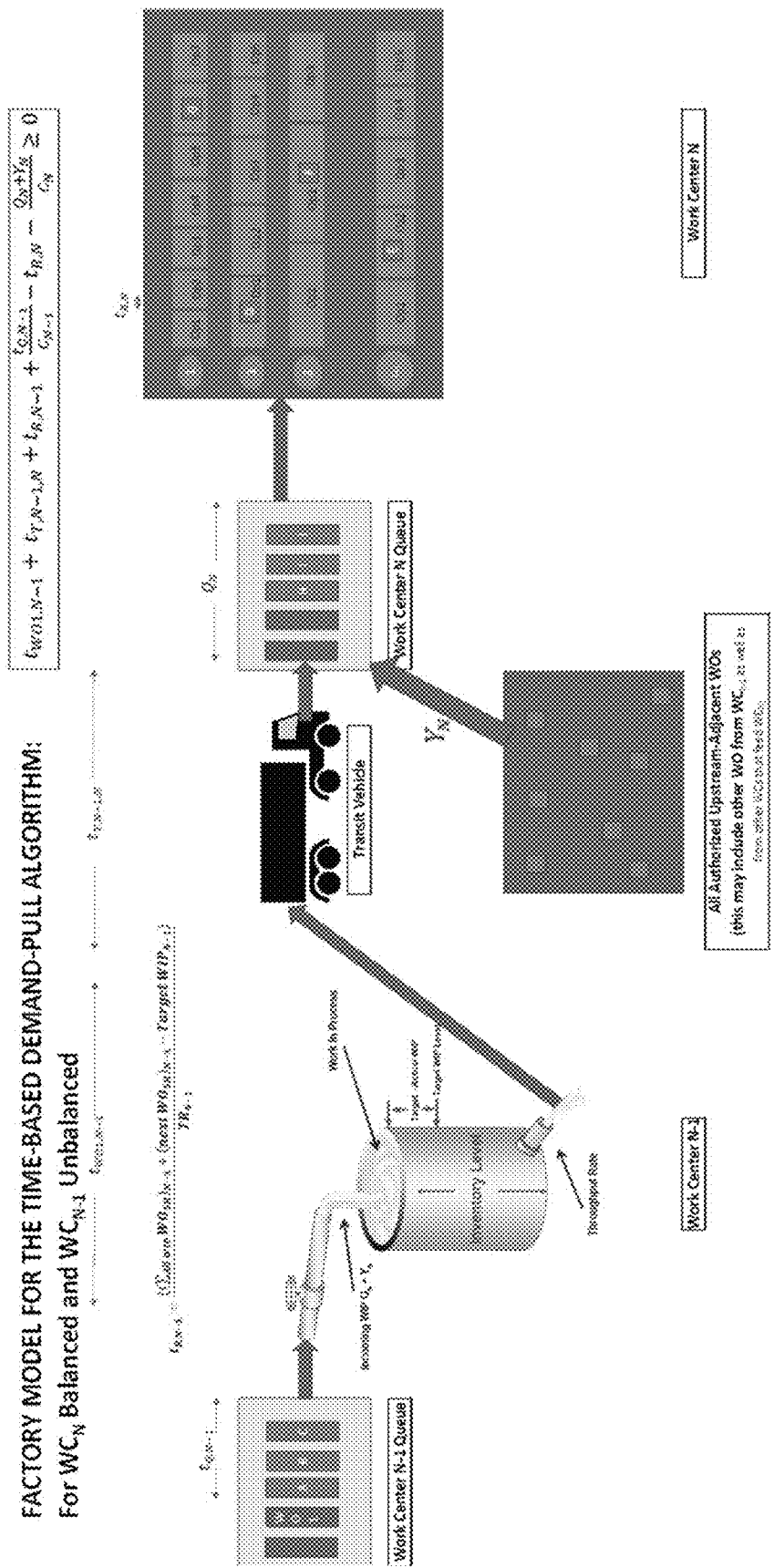
FIG. 17 is a schematic diagram of a factory model implementing a time-based demand-pull operation according to one embodiment of the present invention, where the current work center ($WC_N$) is balanced and the prior work center ($WC_{N-1}$) is unbalanced.

FIG. 17 is a schematic diagram of a factory model implementing a time-based demand-pull operation according to one embodiment of the present invention, where the current work center ($WC_N$) is balanced and the prior work center ($WC_{N-1}$) is unbalanced. In this scenario, the variables of Equation 26 may be defined as follows:

Target $WIP=LT*TR$ $t_{WO1,N-1}$=the Flow Time of $WO_1$ in the same way as in the Balanced Line approach. However, in the Unbalanced Line, R is likely to be 1 and the Flow Time will be the total Standard Process Hours of the WO.

$t_{T,N-1,N}$=the time to transit the WO from $WC_{N-1}$ to $WC_N$.

$$t_{R,N-1} = \frac{\left(\sum_{AllWIP} WO_{SH}\right)_{N-1} + (\text{next } WO_{SH})_{N-1} - \text{Target } WIP_{N-1}}{TR_{N-1}}$$

$$t_{Q,N-1} = \frac{\left(\sum_{AllAuthorizedQueue} WO_{SH}\right)_{N-1}}{TR_{N-1}}$$

$C_{N-1}=1$ $t_{R,N}$=the time at which the next WO will be pulled from the queue—this is the remaining Clear Time of the WO with the least remaining Clear Time in $WC_N$;

$Q_N$=the sum of the Clear Times of all the existing authorized Work Orders in the $WC_N$ queue;

$Y_N$=the sum of the Clear Times of all the existing authorized Work Orders in the UA WCs $C_N$=the number of production lines within Work Center N.

Scenario 3—Unbalanced $WC_N$ and Balanced $WC_{N-1}$

Figure 18:
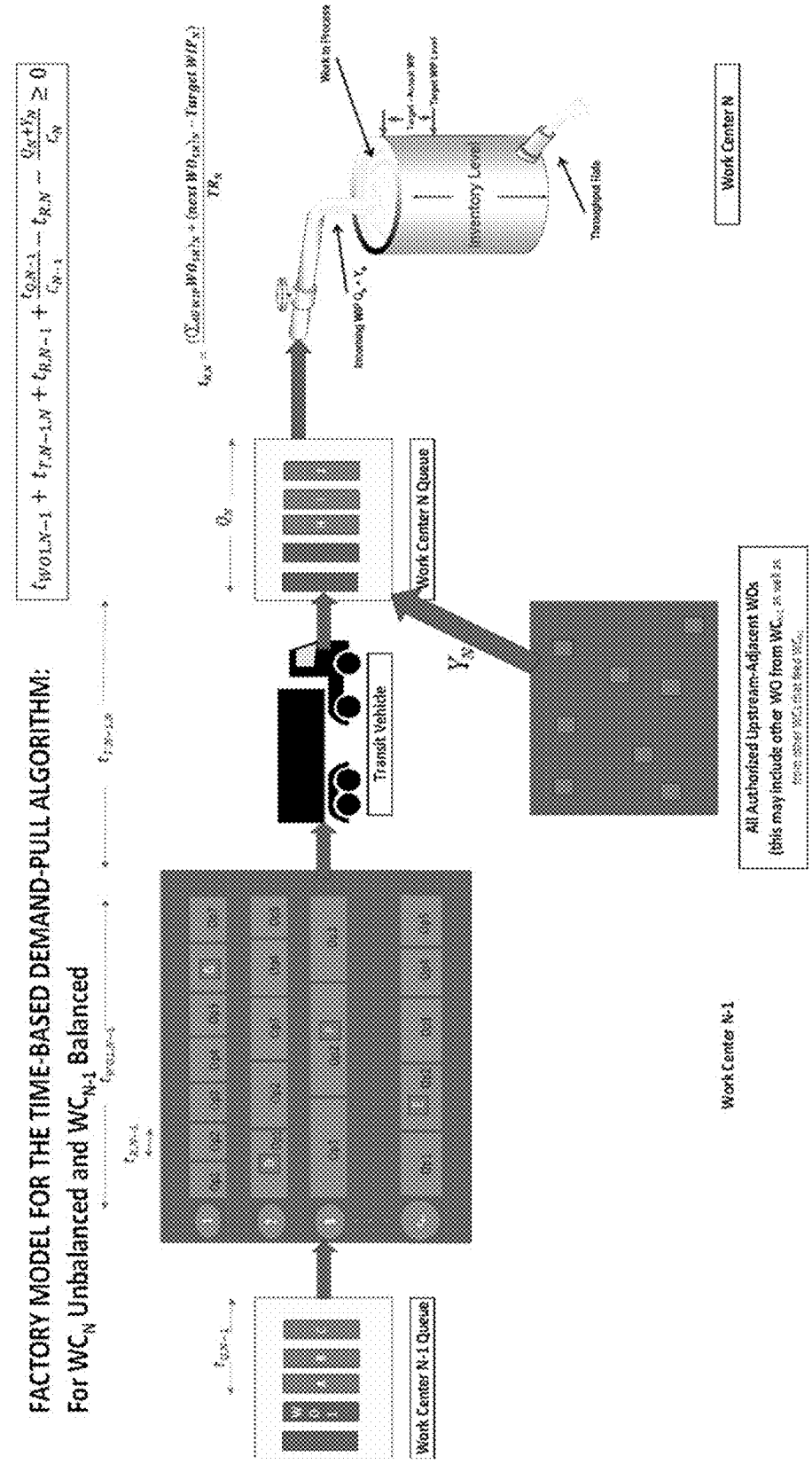
FIG. 18 is a schematic diagram of a factory model implementing a time-based demand-pull operation according to one embodiment of the present invention, where the current work center ($WC_N$) is unbalanced and the prior work center ($WC_{N-1}$) is balanced.

FIG. 18 is a schematic diagram of a factory model implementing a time-based demand-pull operation according to one embodiment of the present invention, where the current work center ($WC_N$) is unbalanced and the prior work center ($WC_{N-1}$) is balanced. In this scenario, the variables of Equation 26 may be defined as follows:

$t_{WO1,N-1}$=the time taken to process $WO_1$ through $WC_{N-1}$, or its Flow Time, calculated in accordance with $$WO_{FT} = R_C * \left(\frac{WO_Q + (B*O_N) - B}{O_N * WO_Q}\right) * WO_{SH}$$

Where: $WO_{FT}$=WO Flow Time $R_C$=Number of units in the largest parallel-processed sub-lot divided by the number of units in the WO. Equals 1 if there are no parallel splits.

$WO_Q$=number of units in the WO

B=Batch size–the number of units in each uniform batch into which the WO is split for serial processing. Equals $WO_Q$ if there are no splits.

$O_N$=Number of discrete operations in the balanced serial workflow sequence.

$WO_{SH}$=Total standard hours for the WO in the WC.

$t_{T,N-1,N}$=the time to transit the WO from $WC_{N-1}$ to $WC_N$.

$t_{R,N-1}$=the time at which the next WO will be pulled from the $WC_{N-1}$ queue—this is the remaining Clear Time of the WO with the least remaining Clear Time in $WC_{N-1}$ $t_{Q,N-1}$=the sum of the Clear Times of all currently-authorized WOs in the $WC_{N-1}$ queue $C_{N-1}$=the number of production lines within Work Center N-1.

$$t_{R,N} = \frac{\left(\left(\sum_{AllWIP} WO_{SH}\right)_N + (\text{next } WO_{SH})_N - \text{Target } WIP_N\right)}{TR_N}$$

$$Q_N = \frac{\sum_{AllQueued} WO_{SH}}{TR_N}$$

$$Y_N = \frac{\sum_{AllAuthorizedUA} WO_{SH}}{TR_N}$$

$$C_N = 1$$

Scenario 4—Unbalanced $WC_N$ and Unbalanced $WC_{N-1}$

Figure 19:
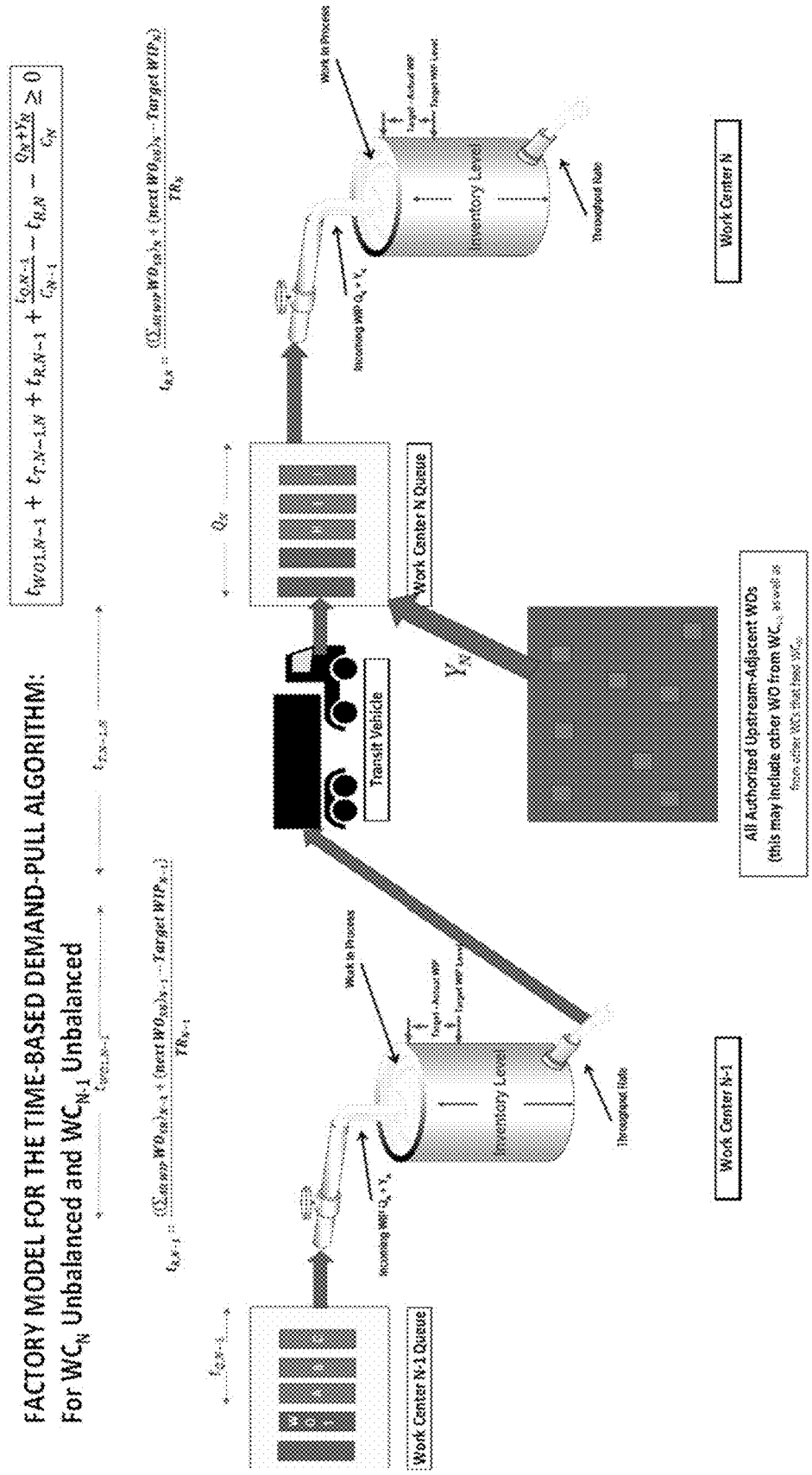
FIG. 19 is a schematic diagram of a factory model implementing a time-based demand-pull operation according to one embodiment of the present invention, where the current work center ($WC_N$) and the prior work center ($WC_{N-1}$) are both unbalanced.
Figure 20:
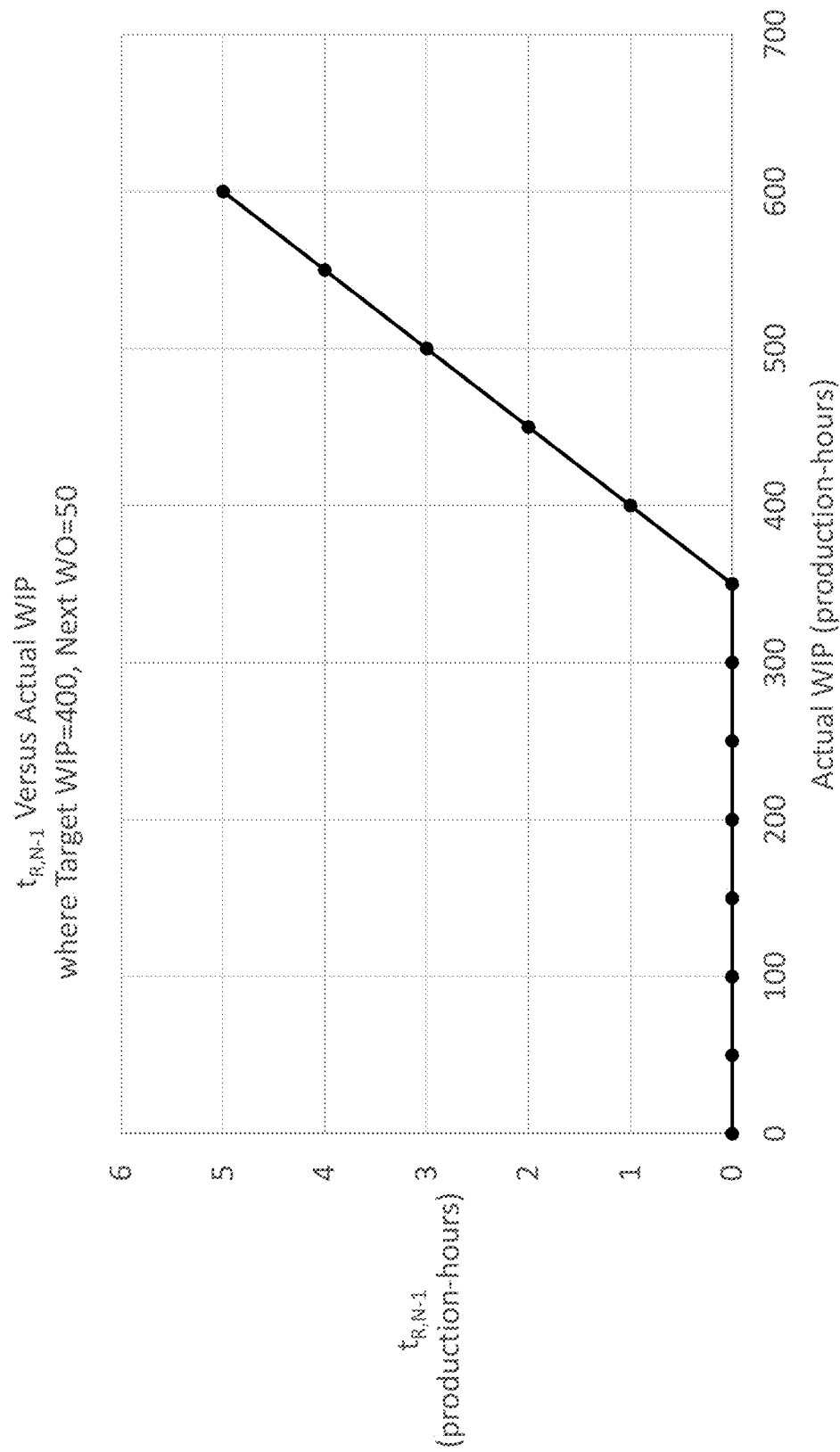
FIG. 20 is an example of a graph of lag time versus actual Work-in-Process (WIP).

FIG. 19 is a schematic diagram of a factory model implementing a time-based demand-pull operation according to one embodiment of the present invention, where the current work center ($WC_N$) and the prior work center ($WC_{N-1}$) are both unbalanced. In this scenario, the variables of Equation 26 may be defined as follows:

Target $WIP=LT*TR$ $t_{WO1,N-1}$=the Flow Time of $WO_1$ in the same way as in the Balanced Line approach. However, in the Unbalanced Line, R is likely to be 1 and the Flow Time will be the total Standard Process Hours of the WO.

$t_{T,N-1,N}$=the time to transit the WO from $WC_{N-1}$ to $WC_N$.

$$t_{R,N-1} = \frac{\left(\sum_{AllWIP} WO_{SH}\right)_{N-1} + (\text{next } WO_{SH})_{N-1} - \text{Target } WIP_{N-1}}{TR_{N-1}}$$

$$t_{Q,N-1} = \frac{\left(\sum_{AllAuthorizedQueue} WO_{SH}\right)_{N-1}}{TR_{N-1}}$$

$$C_{N-1} = 1$$

$$t_{R,N} = \frac{\left(\left(\sum_{AllWIP} WO_{SH}\right)_N + (\text{next } WO_{SH})_N - \text{Target } WIP_N\right)}{TR_N}$$

$$Q_N = \frac{\sum_{AllQueued} WO_{SH}}{TR_N}$$

$$Y_N = \frac{\sum_{AllAuthorizedUA} WO_{SH}}{TR_N}$$

$$C_N = 1$$

VI. Examples with Reference to FIGS. 2 and 2A

The examples set forth in FIG. 2A illustrate the WO authorization process resulting from the pull-test in different circumstances. The values shown in FIG. 2A are in units of hours. In all the examples, a set of WCs such as those shown in FIG. 2 is used. There are two WCs (WC 130 and WC 135) that feed into a third WC (WC 145) and the downstream WC (WC 145) is presumed to be healthy (reference the discussion of Section X) so that the pull-testing for this WC is active. The interrogation of its upstream WCs finds that $WO_1$ is the WO that is currently unauthorized, has the highest priority, and is therefore the candidate to be authorized. The authorization is based on whether the time for this WO to reach WC 145's queue is equal to or greater than the time required to consume the work that has already been authorized ahead of $WO_1$.

In Example 1, the first row of the table, the authorization test is affirmative. The time required for $WO_1$ to reach WC 145's queue is its Flow Time in WC 135=($t_{WO1,N-1}$=4-hours) plus the transit time required to get to the next WC ($t_{T,N-1,N}$=10-hours), plus the remaining time until the next WO start in $WC_{N-1}$ ($t_{R,N-1}$=2-hours), plus the time required to clear all currently authorized WOs that are ahead of $WO_1$ in $WC_{N-1}$'s queue ($t_{Q,N-1}/C_{N-1}$=3-hours). It will therefore take nineteen hours for this WO to reach WC 145 once if it is authorized immediately in its current WC, WC 135. Therefore, the question is "Are there more than nineteen hours of work for WC 145 ahead of $WO_1$?" To calculate this, the time until the next WO is started into WC 145 ($t_{R,N}$=2-hours), plus the time to consume the authorized work ahead of $WO_1$ that is destined for WC 145 or already in its queue (($Q_N+Y_N)/C_N$=7-hours). The sum is nine hours, which is less than the fourteen hours required for $WO_1$ to reach WC 145's queue and, therefore, $WO_1$ is Pull Tagged and authorized for processing—it will unfortunately be 10-hours late.

In Example 2, the processing Flow Time for $WO_1$ in WC 135 is increased to six hours and therefore it will take an additional two hours for $WO_1$ to reach WC 145's queue, or twenty-one hours. Since 21>9, the test is affirmative and $WO_1$ is again authorized for processing in WC 135.

In Example 3, the currently-authorized work ahead of $WO_1$, destined for WC 145 ($Y_N$), is increased to twelve hours as compared to the nine hours in Example 1. In addition, the transit time from $WC_{N-1}$ to $WC_N$ is reduced to 1-hour and the Flow Time of $WO_1$ in $WC_{N-1}$ is reduced to 4-hours. The additional work ahead of $WO_1$ means that $WO_1$ is not required until later than the previous examples and the reduced Flow and Transit times allow it to arrive sooner. These changes result in the authorization test failing; that is, $WO_1$ is not authorized for processing at this time.

In Example 4, the amount of authorized work queued ahead of $WO_1$ ($t_{Q,N-1}$) is increased to 5-hours, meaning that it will take longer to arrive. The authorization test successfully authorizes $WO_1$ in this case.

VII. Demand-Based Production from a Work-Volume Perspective

When looking at authorizing work in upstream stages of production, the traditional Kanban system establishes quantity buffers, or queues, at each WC. Then when the buffer quantity hits a minimum value (the Queue Policy), the Kanban card is returned to its originating WC for replenishment. While this unit-quantity buffer does not work well in a high-complexity production environment (Suri, et al), the concept of a Queue Policy can still be a useful management tool if expressed in work-hours as opposed to unit-quantities.

Within the present TDPS, the concept of a manageable Queue Policy is coupled with the demand flow concept below to create a management framework for setting inventory levels for the queues at each WC. Disclosed herein are a WC buffer, or queue, and a "policy" that provides for adjustment of the inventory in the factory. For this reason, the WC is conceptualized as a two-part entity in FIG. 2, the Queue and the Work-in-Process (WIP) area, and a goal herein is to minimize the hours in the Queue and maximize throughput.

With FAFP processing in mind, this trigger can be expressed mathematically for any given WC "N" ($WC_N$), except the first WC in a production process, as follows (Equation 36):

$$W_N \leq X_N - (Q_N + Y_N)$$

or Equation 37:

$$X_N \geq Q_N + Y_N + W_N$$

Where all variables are specified in Section XV.

When this inequality is true, an authorization attempt is made on $WO_1$. Or, more completely, an upstream pull-authorization will be attempted on $WO_1$ whenever the amount of work in $WC_N$'s queue plus the work upstream that has already been authorized and destined for $WC_N$ is less than the Queue Policy ($X_N$). But the pull-authorization attempt will not succeed unless the amount of work represented for $WC_N$ by $WO_1$ ($W_N$), when added to the current queue ($Q_N$) and currently-authorized UA WOs (either in UA queues or in UA WIP) ($Y_N$) will not exceed the Queue Policy, $X_N$.

Assigning a precise value to the Queue Policy ($X_N$) can now be accomplished within the algorithmic context of Section V set forth above.

VIII. An Optimum Queue Policy

The formulae from Sections V and VII can now be combined to solve for the Queue Policy ($X_N$) from Equation 36:

$$Q_N + Y_N \leq X_N - W_N$$

From Equation 26

$$Q_N + Y_N \leq C_N * \left( t_{WO1,N-1} + t_{T,N-1,N} - t_{R,N} + t_{R,N-1} + \frac{t_{Q,N-1}}{C_{N-1}} \right)$$

Therefore (Equation 38):

$$X_N - W_N = C_N * \left( t_{WO1,N-1} + t_{T,N-1,N} + t_{R,N-1} + \frac{t_{Q,N-1}}{C_{N-1}} - t_{R,N} \right)$$

and the Queue Policy for $WC_N$ is given by Equation 39:

$$X_N = C_N * \left( t_{WO1,N-1} + t_{T,N-1,N} + t_{R,N-1} + \frac{t_{Q,N-1}}{C_{N-1}} - t_{R,N} \right) + W_N$$

From Section VII, this value of $X_N$ can be used to assign a Pull Tag to $WO_1$ destined for a Balanced Line WC when the sum of its Clear Time in $WC_N$ ($W_N$)+the queued Clear Times in the $WC_N$ queue ($Q_N$)+the sum of the Clear Times at $WC_N$ for all authorized UA WOs' ($Y_N$) is less than or equal to that value of $X_N$. For an Unbalanced Line WC, Total Standard Process Hours for the WO would be used instead of Clear Times.

This formula, in the limit where all flow-times are 0, sets a "floor" of $t_{WO1,N}$ hours, which is needed to avoid "starving" a WC by setting a maximum Queue Policy that is less than the number of hours represented by the next WO to be authorized. All of the stated terms are "knowable" quantities within the construct of most ERP/MRP systems so that this construct is easily implementable.

The question can be raised as to why the formula from Section VII is re-introduced to define a pull algorithm, or why the flow formula of Equation 26 cannot just be used to assign Pull tags. The answer is primarily a matter of visual management in a lean environment. The concept of a maximum Queue Policy is a manageable and understandable concept in the factory environment and one for which the TDPS technology provides management over-rides and/or adjustment factors to accommodate the realities of variability in the individual WCs. This pull-system conforms to the idea that when inventory falls below a pre-determined policy level, a replenishment signal is sent, yet at the same time, by using flow times, it is forcing queued inventory toward zero.

IX. An Automated TDPS Embodiment

Figure 6:
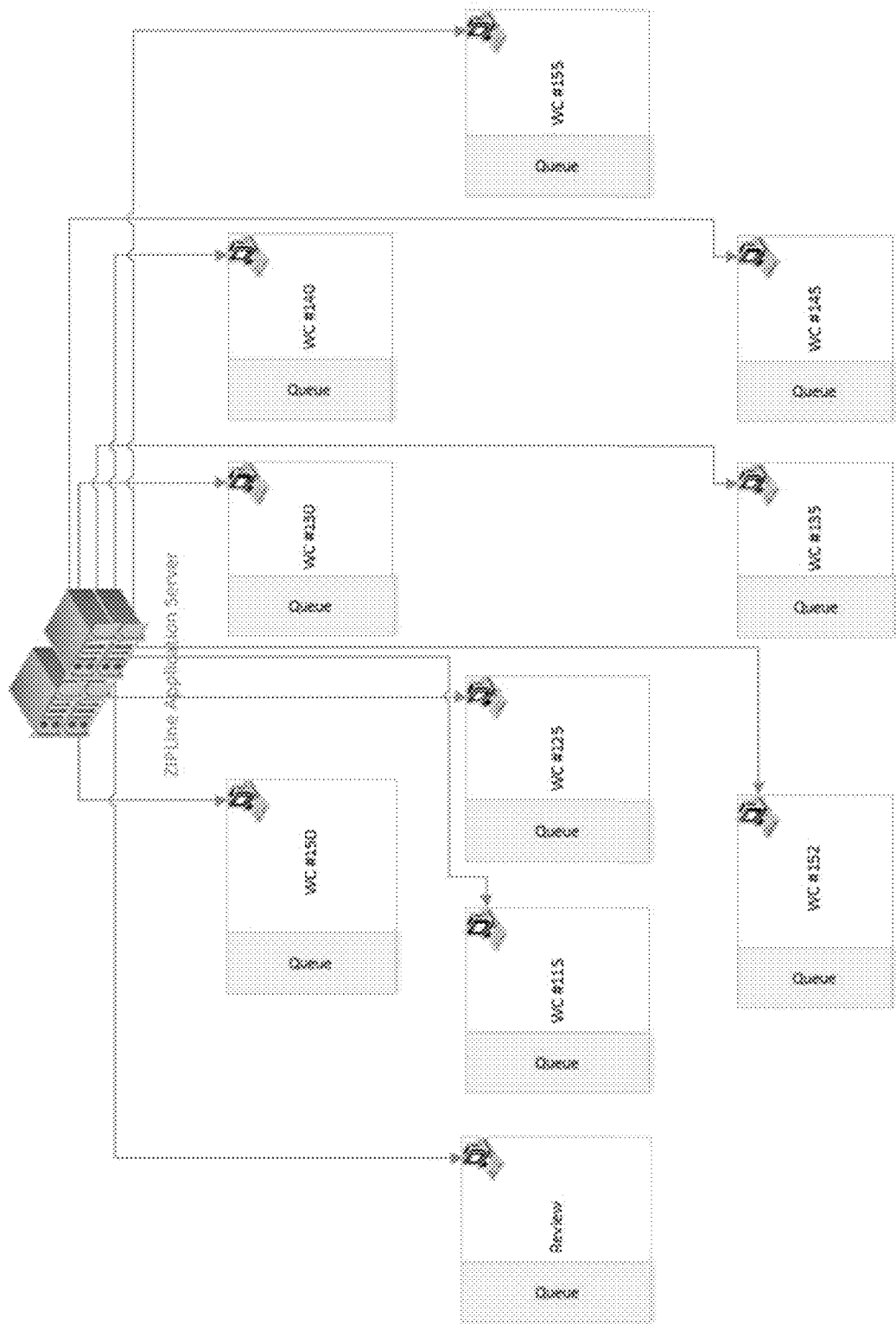
FIG. 6 is a schematic diagram of the architecture of system hardware according to one embodiment of the present invention.
Figure 7:
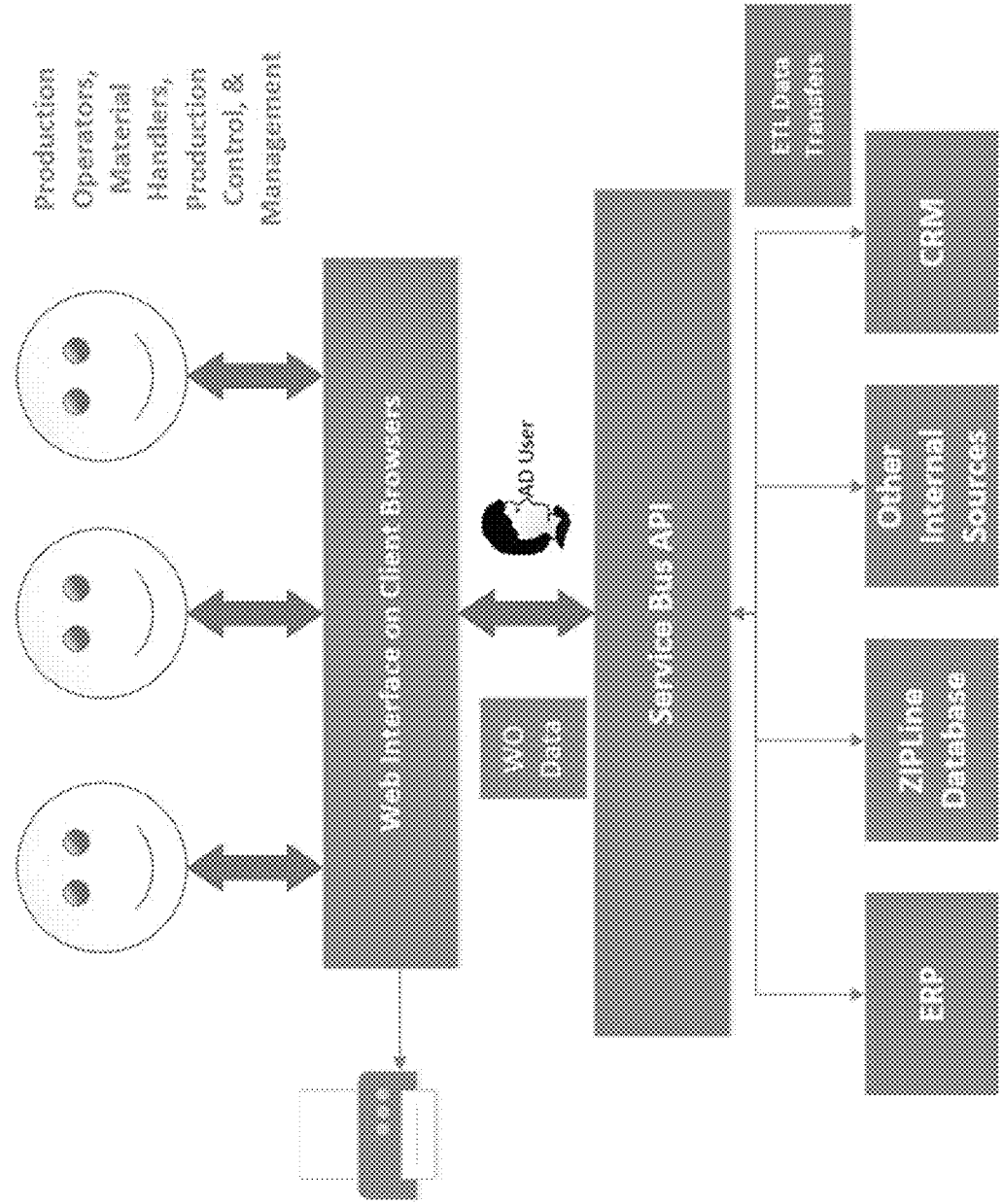
FIG. 7 is a schematic diagram of the architecture of a system according to one embodiment of the present invention.

FIGS. 6 and 7 illustrate a TDPS according to an embodiment of the present invention, which can be implemented using a software system with a database. In one embodiment described herein, a .NET service bus and MSSQL database running on a networked Microsoft Windows server are connected via the local area network (LAN) to individual clients in the various WCs. These clients contain the browser-based Angular JS user interface and connect with the service bus through its Application Programming Interface (API). According to one embodiment, the software system stores status information regarding the work centers and the work orders in the database. This status information may include information received from the electronic devices (e.g., computer systems) at the individual work centers regarding the current conditions at the work centers, including the status of work orders at the work centers and transit times between the work centers.

Likewise, other enterprise-level software applications (ERP, CRM and so forth) interface with the software implementation and can inject new WOs and extract data on those WOs as they flow through the factory. The TDPS communicates through its API with an Enterprise Resource Planning (ERP), Materials Resource Planning (MRP) or other similar system that creates WOs for parts to be produced by the factory. This system should also be capable of storing the associated operation sequence (Workflow), the WCs associated with each operation in the Workflow, standard processing hours per unit (HPU) at each operation, and quantities of units ($WO_Q$) to be produced.

WOs and their associated data (Workflows, HPU, $WO_Q$, and Batch sizes, if applicable, at a minimum) are then introduced into the TDPS Initially, WOs have a Status code of "Pending" and when ready to begin production, the WOs are accepted into production through the TDPS user interface, which action changes the Status to "Open." When a WO is accepted, a time-stamp is created and it is assigned to the Queue of the first operation in the Workflow. This is the beginning of the demand-pull production process.

When demand is detected at the next WC in the WO's Workflow, the WO is assigned a Pull Tag, which authorizes work activities at the first operation in its Workflow. This detection is based on an affirmative result to the aforementioned test from Equation 26, where, in this case, N is the next WC in the WO's Workflow. This test is done in the TDPS software through continuous polling of all WCs in the factory, as well as instantaneously any time a WO is Started or Finished. In other words, when a WO is started into production at a given WC, the system immediately "looks" upstream for a candidate WO to refill its queue by querying the database for a WO that satisfies or best matches the conditions for authorizing a next WO based on a priority-setting rule (e.g., based on whether the Arrival Time of the WO is greater than or equal to the Need Time). Likewise, when a WO is completed and moved to its subsequent WC's queue, a pull-test is performed both upstream and downstream to detect demand. When a pull-test is performed on a WC, a record is logged with a time-stamp and the order of polling of the WCs can be based on this time-stamp. The WC with the oldest time-stamp can be polled first. The polling frequency is a user-defined interval in the TDPS.

All the parameters of the TDPS are tracked, or calculated (such as by the software) on each execution of the Pull-test. The relevant parameters can include:

Database Stored:

$$C_N, t_{WO1,n-1}, t_{T,N-1,N}, C_{N-1}, B, O_N, t_{WO1,N}$$

Calculated:

$$X_N, t_{R,N}, t_{R,N-1}, t_{Q,N-1}, Q_N, Y_N$$

In addition, some of the calculated values are based on other parameters that are system generated or stored in the database.

Specifically (for the Balanced Line case):

$t_{R,N}$—is the remaining Clear Time for the WO in $WC_N$ with the least Clear Time remaining and is calculated as the difference between the Clear Time for the relevant WO in $WC_N$ and the elapsed time since the WO was started. Therefore, the system captures the Elapsed Processing Time for each WO. Then:

$$t_{R,N} = \text{Clear Time} - \text{Elapsed Processing Time}$$

Likewise, $t_{R,N-1}$ is a similar calculation done on the WOs in $WC_{N-1}$ to determine the remaining Clear Time for the WO in $WC_{N-1}$ with the least Clear Time remaining.

$t_{Q,N-1}$ is the sum of the Clear Times for $WC_{N-1}$ for all WOs in its queue that have been authorized. Since this calculation depends on the TDPS's ability to determine which WOs have $WC_N$ as the next WC in their Workflow, the TDPS stores all the operations in the WO's Workflow as well as the sequence of those operations and their associated WCs. Then it stores in its database all authorization records, their associated WOs and WCs so that it can identify the WOs that are UA to $WC_N$ and that have been authorized for production in their current WC.

Likewise, $Y_N$ relies on calculating its Clear Times for $WC_N$ and relies on the associated authorization records. This calculation knows that:

a. the WO has been authorized; and b. the next WC in the WO's Workflow is $WC_N$— so for that reason, the TDPS has stored all the steps in the WO's Workflow as well as the sequence of those steps.

$Q_N$ and $t_{WO1,N}$ are calculated on the basis of Clear Times, since no authorization association is needed for these two values.

Figure 15:
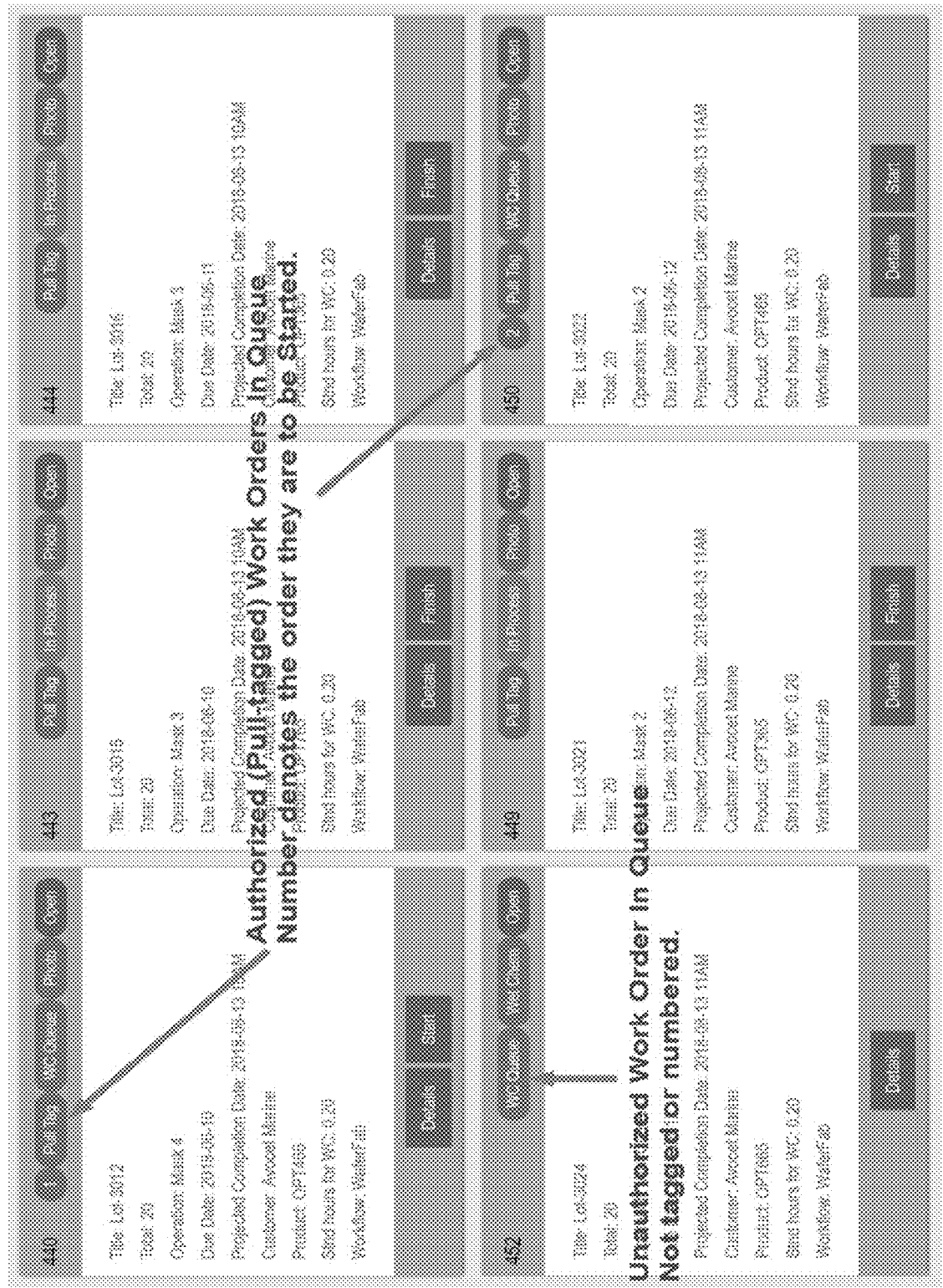
FIG. 15 is an annotated depiction of a user interface for managing Work Orders in a Work Center.

Ultimately, the purpose of this system is to provide direction to operators and/or machines as to which WOs should be pulled from the WC queue and started into production. An image of a screen on a client monitor in an exemplary WC is shown in FIG. 15. From this screen, operators and/or machines are instructed as to the status of each WO in the WC and exactly which WO is to be started next.

Figure 8:
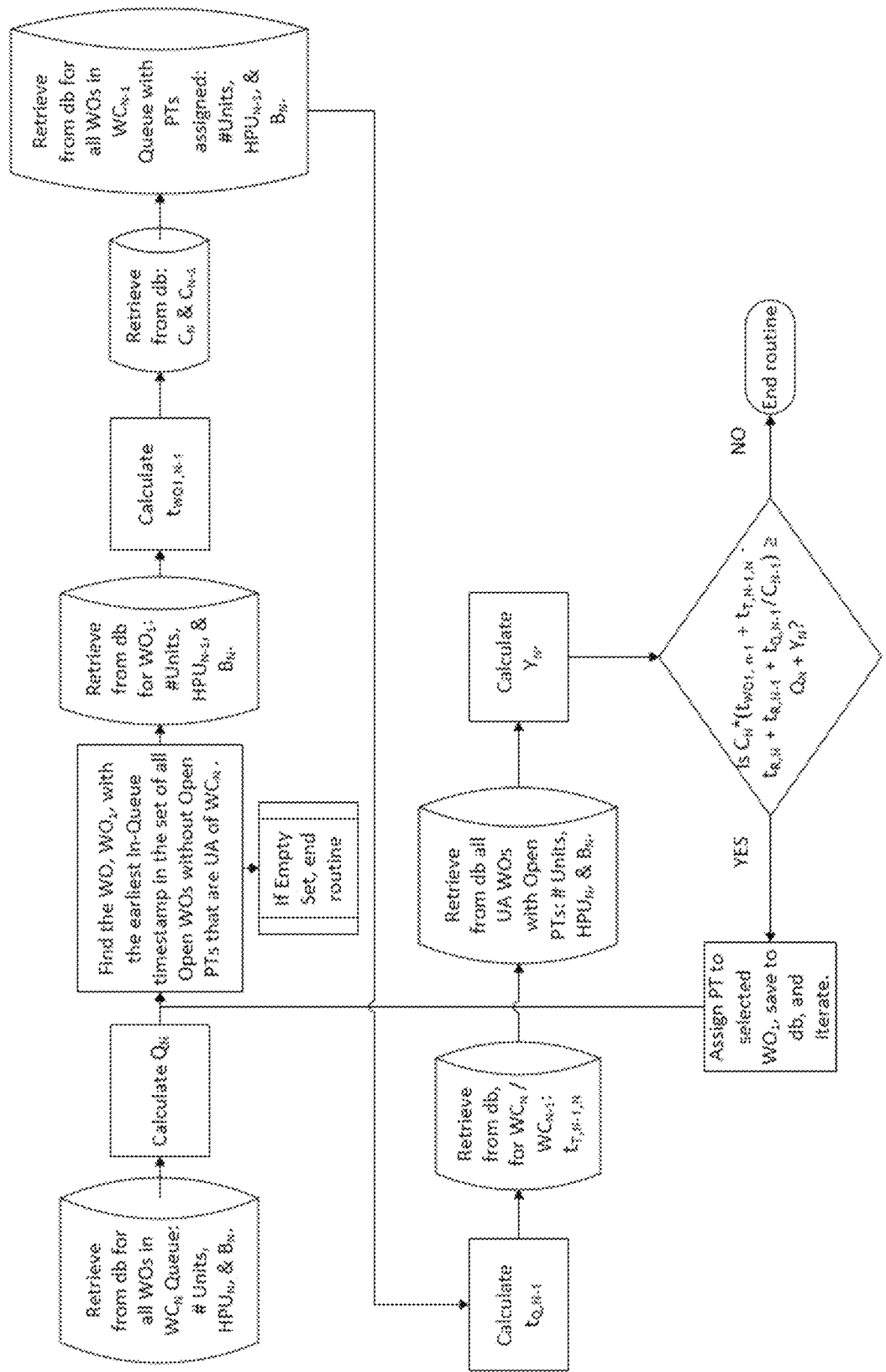
FIG. 8 is a flowchart of a method for implementing a pull test for a Work Center without a queue concept.

A flowchart of the pull-system logic of the system is shown in FIG. 8. Explanations of the terms used therein are found in Section XV.

X. Work Center Performance Testing

When a problem reduces production rates in a WC, the WOs in its UA WCs may stall. As previously discussed, the pull-test assumes that all WOs in the $WC_N$ queue will be authorized for work prior to the arrival of $WO_1$. Because of this, all WOs, authorized or not, are included in the pull-test that calculates the time at which $WC_N$ will be ready to consume $WO_1$. If some of this work is "stuck" and not authorized for work in a timely fashion, it can delay the arrival of $WO_1$ and "starve" the WC of work and also starve the problem WC's sibling WCs of work if they share $WC_N$ in their Workflow.

Production problems such as this can be caused by insufficient capacity, newer employees not meeting time standards, material quality or availability problems, or quality standards not being met. All these causes, and more, can affect the Flow Time and throughput of a WC. The TDPS must detect these problems and impose a Hold (the pull-test algorithm ignores WOs that are on Hold) on WOs in WCs that are upstream of the problem WC so that they do not throttle upstream pull signals and thereby starve their sibling WCs.

An indication of a problem in a WC is the consistent inability to meet the work standards (e.g., Standard Hours Per Unit). Each WC's performance is therefore measured at the time it is polled for pull-testing, and a performance value of standard hours versus actual hours is computed and compared to a threshold, above which triggers a Hold for all upstream WOs and notifies the WC management. Stated more specifically, prior to running the pull-test algorithm for a given WC, a WC performance check is done, whereby the sum of the actual hours for all in-process WOs in the WC is compared to the sum of the standard hours for these same WOs. If this comparison exceeds a set, configurable, percentage, a Hold is triggered for all upstream WOs that are destined for this WC and the pull-test is skipped. This process is self-correcting since in the next polling round for the WC, if the problems have cleared up, the Hold would be released and flow would begin again.

The test:

If:

$$\frac{\sum_{WO=1}^{WO=n} \text{Actual Hours Worked}}{\sum_{WO=1}^{WO=n} \text{Standard Hours}} < P$$

Then the WC is "healthy" and pull-testing is done normally.

If:

$$\frac{\sum_{WO=1}^{WO=n} \text{Actual Hours Worked}}{\sum_{WO=1}^{WO=n} \text{Standard Hours}} \geq P$$

Then the WC is "un-healthy," pull-testing is suspended, and all upstream WOs destined for this WC are put on Hold.

Where P is a configurable system variable, e.g. 1.5 (meaning the actual hours worked for all WOs in the WC is currently 150% of the standard hours).

XI. Other System Features

When demand for a WO is detected by the system, an authorization record is created in the database and associated with the WO and the relevant WC. Once a WO is authorized by the TDPS, the WO can then be Started into the WC by the WC staff and the system begins to record the WO's processing time. No work activities can be Started on a WO unless the WO has been authorized by the TDPS.

The authorization algorithm is executed automatically when a WO is Started or Finished at a WC. This allows WOs to be authorized immediately after Need Time is known to have changed rather than wait for a polling system to run the authorization algorithm at a later time. The authorization algorithm will target the specific WCs where Need Time has changed. When a WO is Started, the algorithm will be executed at the WC at which the WO is started to allow UA WOs to be pulled. When a WO is Finished the algorithm will be executed at the next downstream WC for the WO to allow it to be pulled immediately if appropriate. In this way, the system instantly identifies and authorizes new incoming WOs to assure a steady flow of production.

Once the work activities are completed in that WC, the WO is Finished by the WC staff, the authorization is removed, and the WO is moved to queue of the next WC in its Workflow. When the WO is Finished, the staff may enter any units that were lost due to scrap or yield loss along with the predefined scrap codes that provide information on the cause for the losses. Each "pull" of a WO creates a unique authorization record, which is opened for the duration of the activity in that WC, then closed when the WO is moved to the next WC's queue. The information associated with the authorization record is then retained in the database for reporting purposes.

These calculations also require that the system track the current number of units in a WO in an environment where units may be lost to scrap, yield loss or other reasons during the production process. The demand-pull system also accounts for losses during production. The reasons for the losses are also captured in the database for management and quality control purposes.

Figure 11:
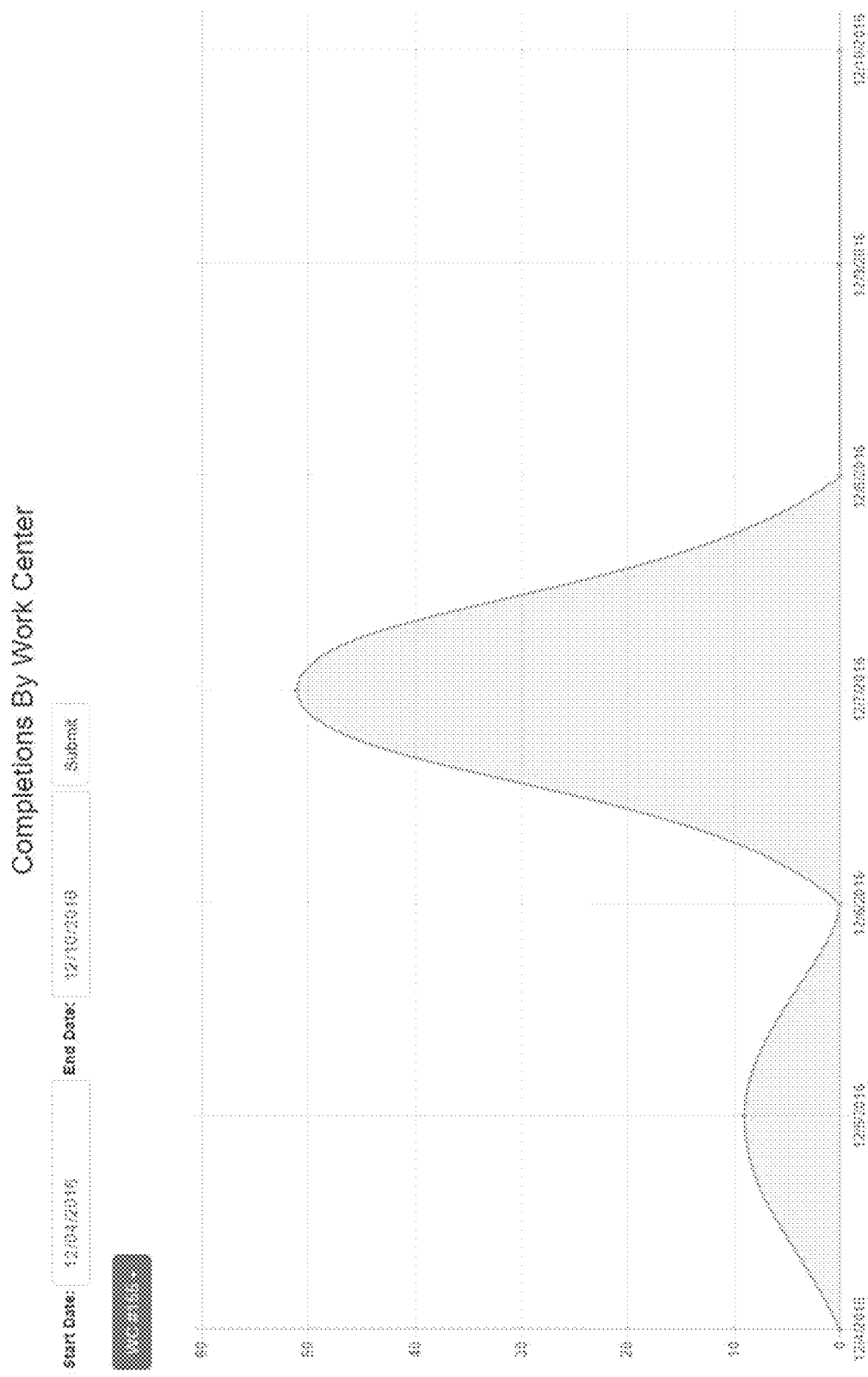
FIG. 11 is depiction of a user interface showing a graph of an example of completions by work center over time.
Figure 12:
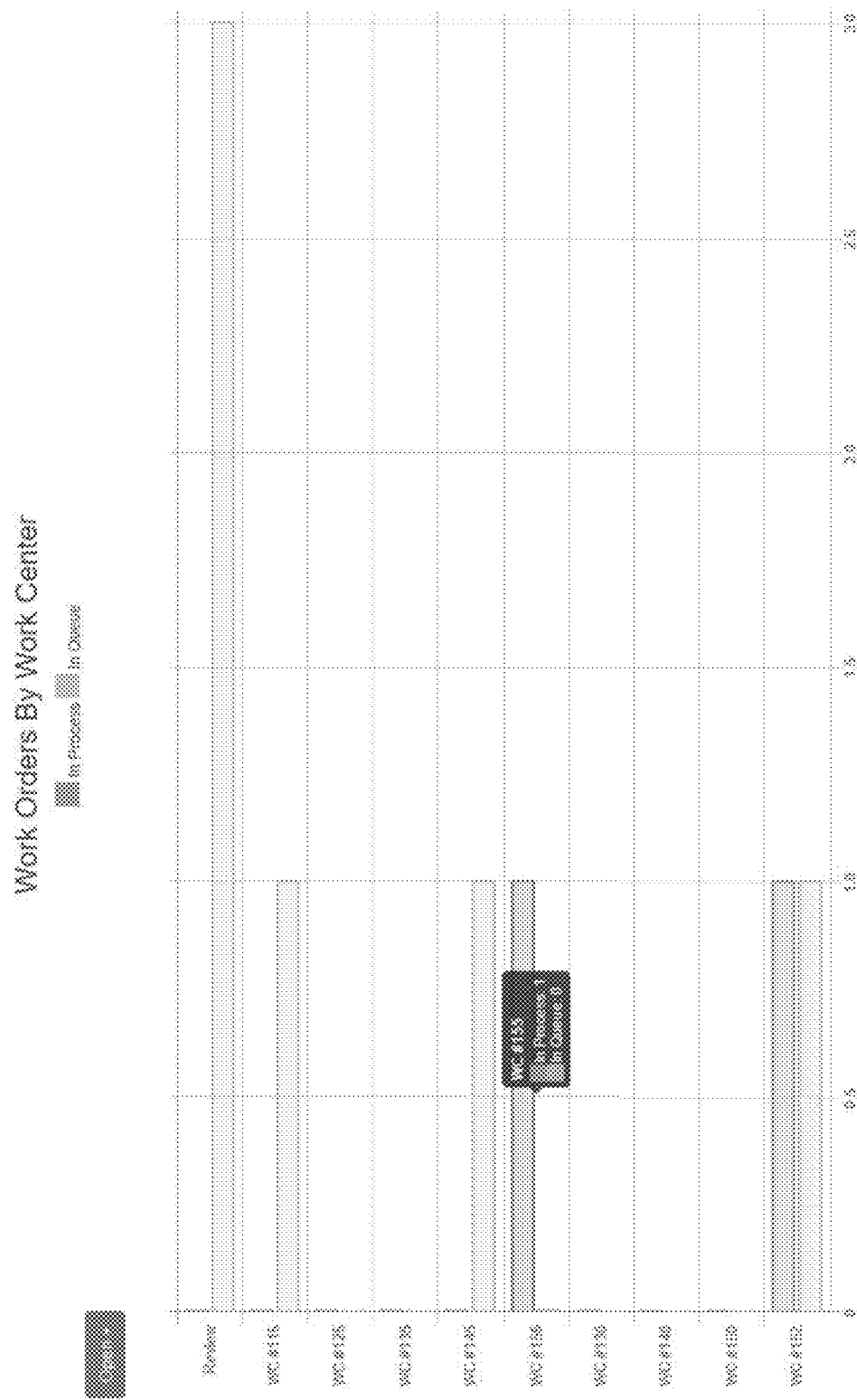
FIG. 12 is a depiction of a user interface showing work orders by work center.

The TDPS software has an open API, so all data associated with WOs, including its status, quantity, and location, can be interrogated by external systems at any time through an API call. The TDPS can also have a series of built-in metrics for management oversight, two of which are shown in FIG. 11 and FIG. 12, and a simple JavaScript framework (angular-charts.js) for creating new metrics.

FIG. 8 is a logic flow chart of a software embodiment of the described TDPS without a Queue Management feature.

Figure 9:
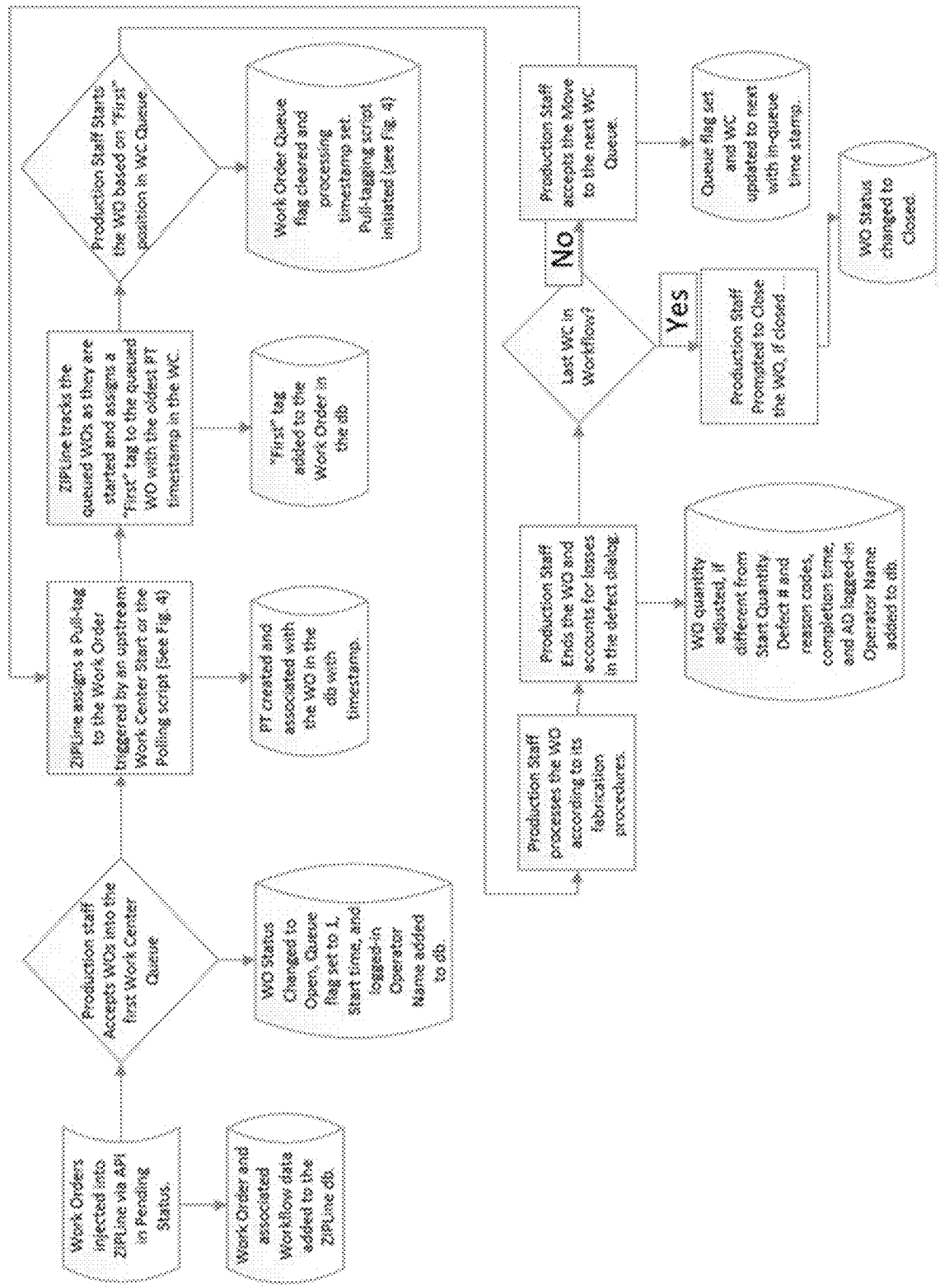
FIG. 9 is a flowchart of a method for implementing Time-based Demand Pull Systems according to one embodiment of the present invention.

FIG. 9 is a work-flow diagram depicting the activities in a typical factory environment and the resulting actions in the D-P System software.

Figure 10:
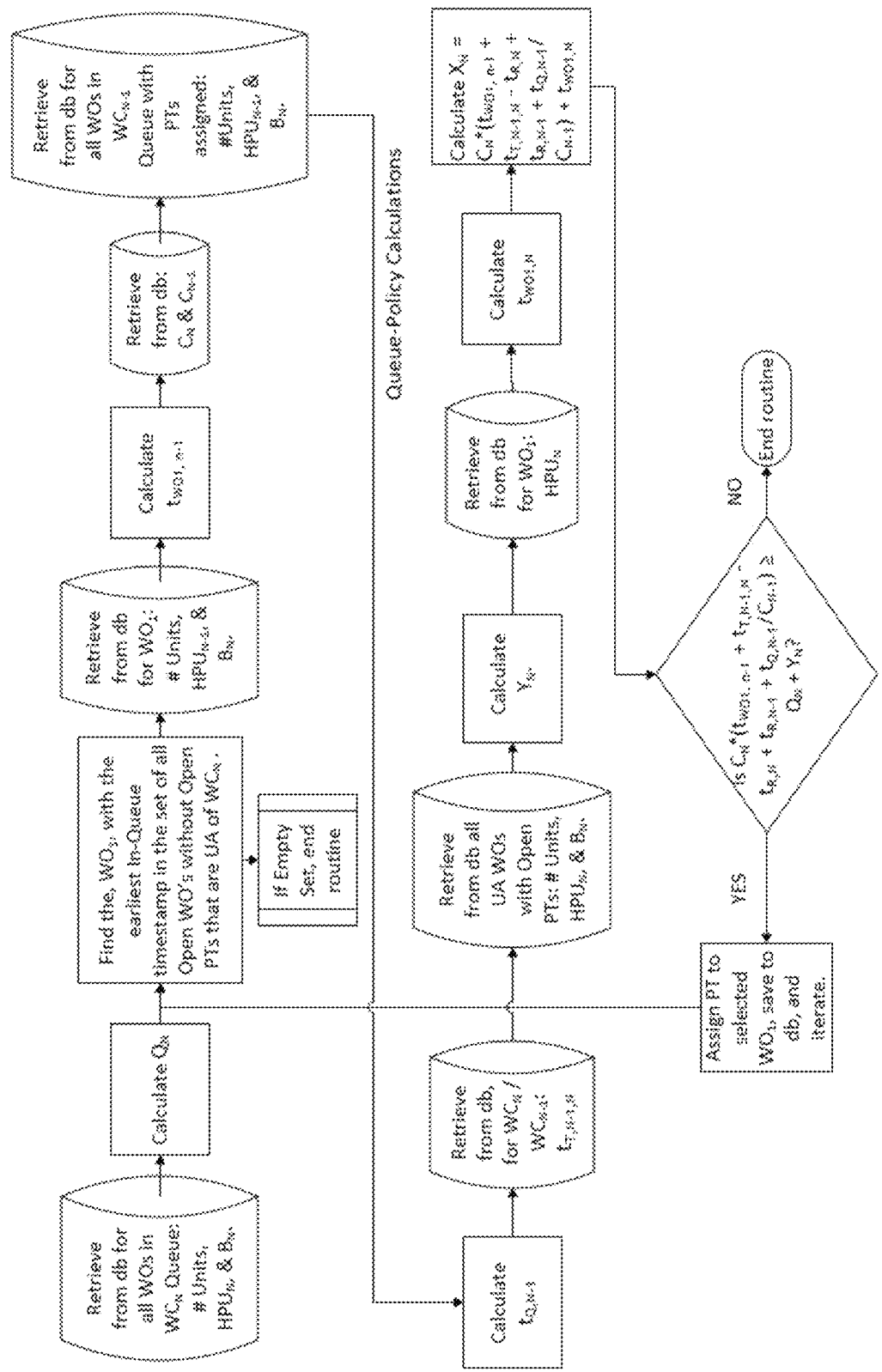
FIG. 10 is a flowchart of a method for implementing a pull test for a Work Center with a queue policy ($X_N$).

FIG. 10 is a logic flow chart of the software embodiment with a Queue Management feature.

Figure 3:
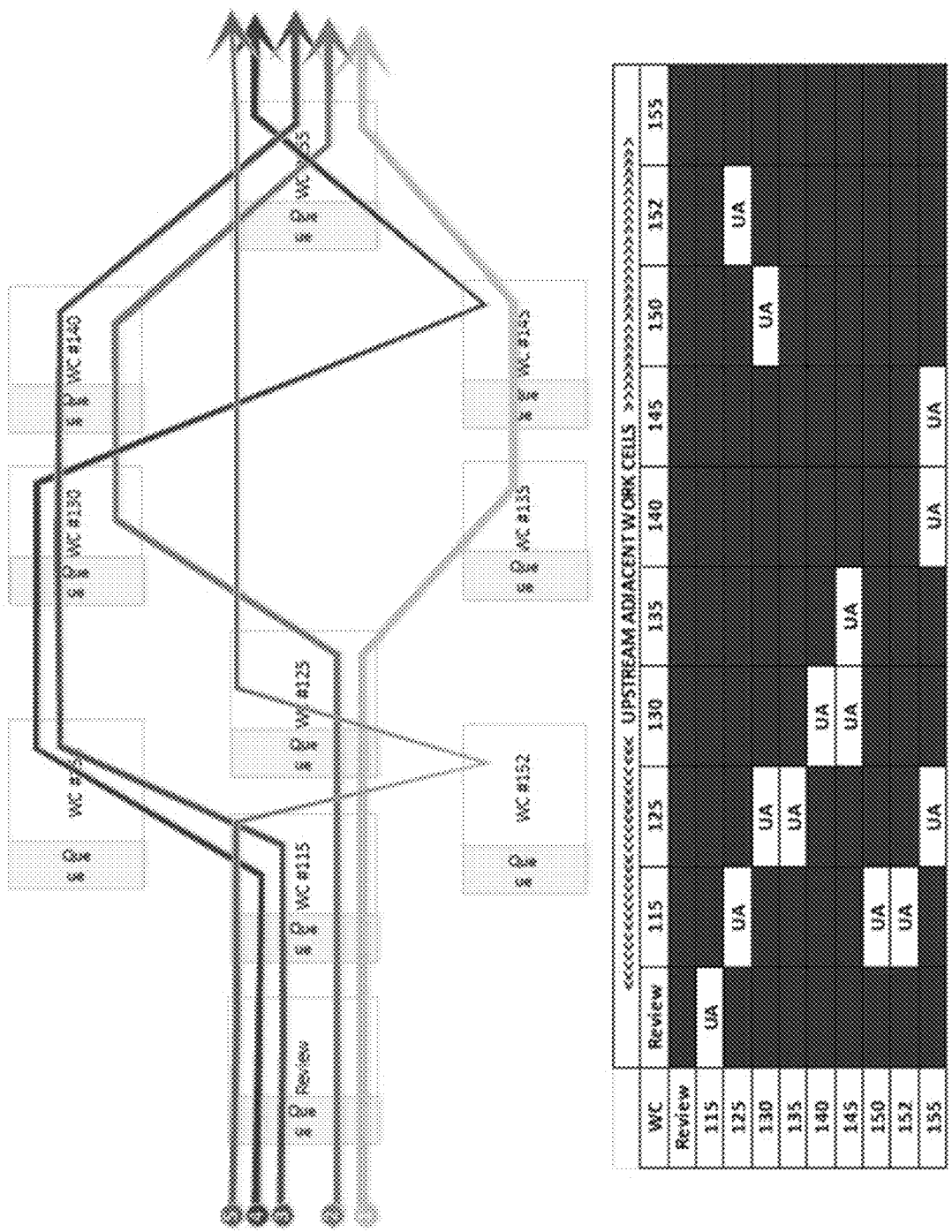
FIG. 3 depicts sample product workflows of work orders through work centers.
Figure 4:
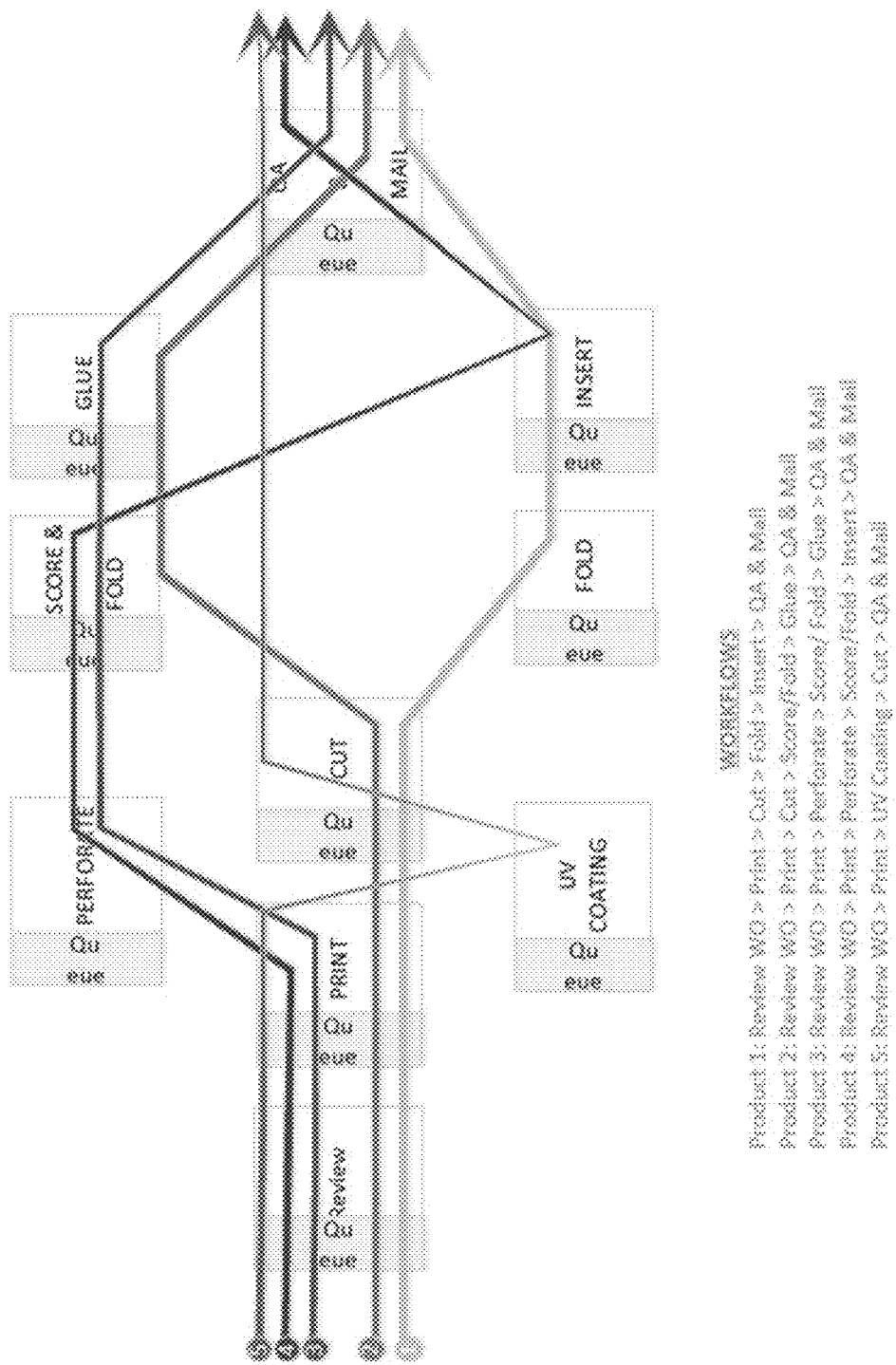
FIG. 4 depicts an example of a product workflow of work orders through work centers of a print/mail shop.

FIG. 11 is an exemplary graph illustrating completions by WC of FIG. 3 workflows.

FIG. 12 is a graph illustrating cycle time and inventory of WOs by WCs of FIG. 3.

XII. Compensating for Highly Variable WO Flow Times

In some production environments, there may be large variations in the Flow Times of WOs in the UA WCs and using a strict application of the referenced algorithm could periodically result in WC starvation. For example, neglecting Transit Time for the moment, if the Flow Time of $WO_1$, the highest priority WO in UA WCs, is 2-hours, the system would authorize $WO_1$ when the Need Time in the downstream WC is 2-hours. Moreover, it would not authorize any other WOs in the UA WCs until $WO_1$ was authorized. But if the next highest-priority WO's (call this $WO_2$) Flow Time is 15-hours, for example, although the system would immediately authorize the $WO_2$ once it authorizes $WO_1$, there would still be a potential starvation Period of (15−2−$WO_1$'s Clear Time) hours in the downstream WC.

Figure 13:
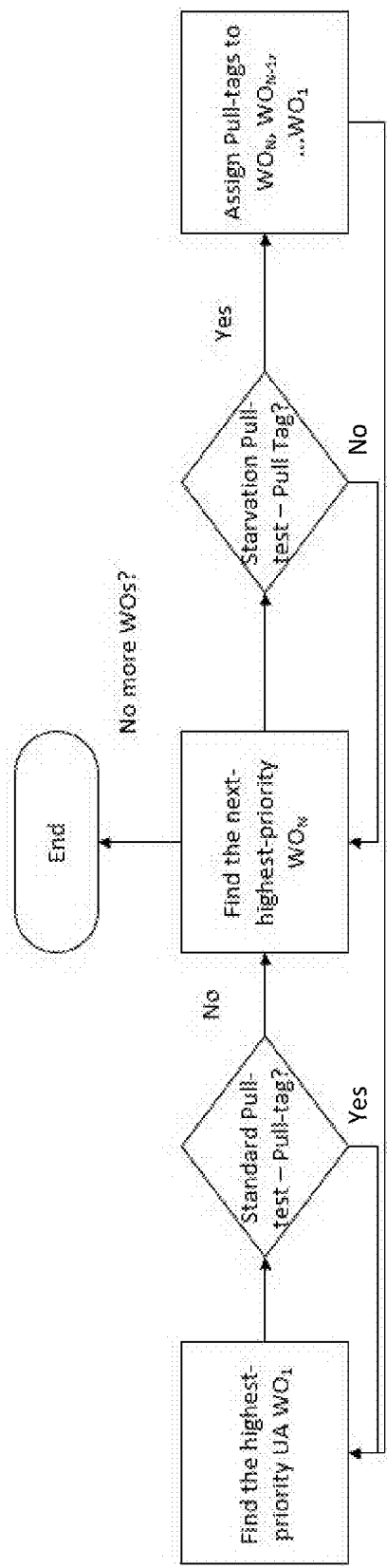
FIG. 13 is a flowchart of a method for implementing anti-starvation in a pull-testing mode of operation according to one embodiment of the present invention.

To compensate for this scenario, the pull algorithm tests for the described condition sequentially according to prioritization for all possible authorizable WOs in UA WCs. These tests assume all higher priority WOs to the current WO were authorized. If it detects such a condition, it authorizes all necessary WOs. While in this case some WOs will arrive early, the system will avoid a more negative starvation condition. The logic diagram for this feature is found in FIG. 13 and the algorithm is as follows. For the Standard Pull-test:

$$t_{WO1,N-1} + t_{T,N-1,N} + t_{R,N-1} + \frac{t_{Q,N-1}}{C_{N-1}} - t_{R,N} - \frac{Q_N + Y_N}{C_N} \geq 0$$

For the Starvation Pull-test:

$$t_{WOx,N-1} + t_{T,N-1,N} + t_{R,N-1} + \frac{t_{Q,N-1}}{C_{N-1}} - \sum_{y=1}^{x-1} t_{WOy,N} - t_{R,N} - \frac{Q_N + Y_N}{C_N} \geq B_S$$

In some embodiments, this may be expressed as:

$$-t_{R,N-1} - \frac{t_{Q,N-1}}{C_{N-1}} + \sum_{y=1}^{x-1} t_{WOy,N} + t_{R,N} + \frac{Q_N + Y_N}{C_N} + B_S \leq t_{WOx,N-1} + t_{T,N-1,N}$$

Where $B_S$ is a company policy for risk aversion (e.g., in hours), and where X is the incremented Work Order ordinal value, where X=1 is the highest-priority Work Order, X=2 is the next highest, and so on.

XIII. Application of Machine Learning

Because this system is algorithm-based, the precepts of artificial intelligence can be applied to improve the system over time. Some aspects of embodiments of the present invention relate to training mathematical models for estimating Need Time and Arrival Time based on collected data of actual Need Time and Arrival Time under various conditions. The system depends on time standards to predict the Arrival Time of a WO from one WC to the next, but time standards are estimates and the actual production time will almost always vary from one WO to another, based on many variables in the production environment. Similarly time standards are involved in calculating the Need Time of a WC and variations between actual operation times and standard operation times will cause the Need Time estimates to be inaccurate.

Variables affecting these can include:
1. The person that developed the standards
2. The production resource that performs the production operation
3. The WC producing the part
4. The type of material used to produce the part
5. The part complexity of the part number being produced
6. The part maturity of the part being produced
7. The production shift on which the part was produced
8. Machine calibration level (% of time consumed of calibration interval)
9. Machine maintenance level (% of time consumed of calibration interval)
10. Raw material vendor(s) maturity
11. Raw material vendor(s) Quality
12. And many other factors that may be factory-specific Over time, data is collected on actual and estimated Arrival Times, Need Times, Flow Times, Transit Times, and other elements of the algorithm and the influence of these factors is determined using linear regression to compute a trained model. The coefficients of the elements of the algorithm are then modified based on these factors, thus producing a more and more accurate system (in other words, training a more accurate model). As accuracy improves, less and less intervention is required by factory personnel. While embodiments of the present invention are described above in relation to using computing the coefficients of a linear regression based on the collected data, embodiments of the present invention are not limited thereto and other trained models may be used, such as support vector machines, deep neural networks, recurrent neural networks, and the like.

XIV. Comparison of Time-Based Demand-Pull Versus POLCA

POLCA (Paired Overlapping Loops of Cards with Authorization) is a prior art system to produce solutions to the application addressed herein, that is, demand-based shop floor control in a high mix, or high variety, production environment. POLCA has various pre-requisites to implementation:

1. a High Level Material Requirements Planning system (HL/MRP);
2. a cellular organization;
3. cells involved in the implementation have rough-cut capacity and lead-time planning ability; and
4. the HL/MRP system (or an associated scheduling system) can produce dispatch lists.

The demand-pull system of the present disclosure advantageously does not require 3 or 4 above, Once the pre-requisites for POLCA are met, the following activities, at a minimum are required to execute the system:

1. Each pair of adjacent WCs within the production environment must be defined so that POLCA cards can be created that are unique to each WC pair. When new WC pairings are created by new products or variations on existing products, more POLCA cards must be defined.
2. The number of POLCA cards for each WC pair must be computed based on production forecasts and WC capacity. When forecasts or capacity changes, the card numbers must be adjusted to compensate.

The present demand-pull system is rules-based: no color-coded cards, no pairing of WCs, no creating work quanta, no calculating the optimum numbers of cards, and no dispatch lists (unless an organization decides to supplement prioritization with MRP-based time). It is, therefore, simplified and optimum for a software embodiment. In addition, POLCA requires considerable ongoing maintenance as explained below.

1. Work cells must be paired based on any possible combination of production sequences, and if a new product with a different workflow is introduced, these new pairings must be added to the system, and cards generated.
2. POLCA requires that physical, multi-colored cards be created that circulate with the WOs through the production facility, and the demand-pull system of the present disclosure does not require them.
3. POLCA requires periodic examination of WC pairs, capacity, and throughput projections to regulate the numbers of POLCA cards that are allowed, so management must periodically add or remove cards based on conditions in the factory. The demand-pull system's algorithm is self-regulating and automatically adjusts the WC queue policy to compensate for changes in capacity and WIP.

4. POLCA uses MRP dispatch lists to determine which work is authorized and the sequencing of the work. This returns the system to a "quasi-push" system and dispatch lists can be labor intensive and subject to inaccuracy. The demand-pull system herein assumes that if a WO has been created by MRP and accepted into production, that it is valid and should move through production as expeditiously as possible. Sequencing of work is a two-step process: 1. First the WO must be authorized based on its priority and downstream demand; 2. Once authorized, WOs are pulled into production on a First-Authorized, First-processed (FAFP) basis: the first WO in a WC's queue to be authorized is the first one to be worked on. There are over-ride provisions in the system, but the present demand-pull system works automatically based on FAFD. The authors prefer that the priority-setting method for the authorization step be First-In-First-out, but other methods have been discussed in Section II of this disclosure.

Although the present inventions have been described in terms of various embodiments above, numerous modifications and/or additions to the above-described embodiments would be readily apparent to one skilled in the art. The embodiments can be defined as methods of use carried out by any one, any subset of or all of the components and/or users; as systems of one or more components in a certain structural and/or functional relationship; and/or as subassemblies or sub-methods. The embodiments of the present invention can include each of the individual components separately. However, it is intended that the scope of the present inventions extend to all such modifications and/or additions and that the scopes of the present inventions are limited solely by the claims set forth herein. Embodiments of the present inventions include the methods being included or distributed in floppy disks, CD-ROMs, DVDs, over the Internet, as a programmed computer (e.g., a computer programmed to perform a special purpose function as described herein), a processor and a non-transitory computer-readable medium, and others as would be apparent to those skilled in the art in view of this disclosure.

Although the terms first, second, third and so forth may be used herein to describe various members, elements, components, regions, layers and/or sections, these members, elements, components, regions, layers and/or sections should not be limited by these terms. These terms may be used to distinguish one element, component, region, layer or section from another region, layer or section. Terms such as "first," "second" and other numerical terms when used herein do not imply a sequence or order unless clearly indicated by the context. Thus, a first member, element, component, region, layer or section discussed below can be termed a second member, element, component, region, layer or section without departing from the aspects of the present teachings.

| XV. Table of Definitions | | | |
| --- | --- | --- | --- |
| # | Item Description | Variable | Formula/Explanation |
| 1 | Arrival Time | $T_A$ | The total elapsed time, in production-hours, a WO will take to arrive at its next WC starting at its time of authorization. |
| 2 | Balanced Line | | a sequence of processing operations, each of which requires roughly the same time to complete. |

-continued

XV. Table of Definitions

| # | Item Description | Variable | Formula/Explanation |
|---|---|---|---|
| 3 | Batch Size | B | This is a constant value entered by admin staff. If the WO will not be serially split, the B is equal to the WO # Units. |
| 4 | Clear Time | $t_C$ | the elapsed processing time required for a WO to complete the first operation in a WC. $\left(\dfrac{HPU * WO_Q}{O_N}\right)$ |
| 5 | Flow Time | | The elapsed Production-hours required to complete a WO from start to finish through a given WC. |
| 6 | Flow Time for $WC_N$ for $WO_1$ | $t_{WO1,N}$ | The elapsed Production-hours required to complete $WO_1$ from start to finish at $WC_N$. |
| 7 | Flow Time for $WO_1$ through $WC_{N-1}$ | $t_{WO1,N-1}$ | The elapsed Production-hours required to complete $WO_1$ from start to finish at $WC_{N-1}$. |
| 8 | Flow Time Ratio | R | The ratio of Flow Time to Standard Process Hours in a balanced line. $\boxed{R_C * \dfrac{WO_Q + (B * O_N) - B}{O_N * WO_Q}}$ |
| 9 | Flush Time | $t_F$ | The elapsed processing time required for a WO to complete all operation subsequent to the first operation. $(O_N - 1) * O_{HPB}$ |
| 10 | High-complexity Production | | Production that involves one or more of the following attributes: many different parts being produced many different work-flows being employed non-linear workflows that form re-entry loops between WCs |
| 11 | Lead Time | LT | The average, or target, number of production-hours required to complete a WO in a WC start-to-finish. |
| 12 | Max Split Ratio | $R_C$ | $\dfrac{\text{\# Units in largest sublot}}{\text{\# Units}}$ |
| 13 | Need Time | | The elapsed time, in production-hours, until a WC will consume all currently-authorized WOs and be ready to begin production on the Next WO. |
| 14 | Number of capacity units within $WC_N$ | $C_N$ | This is a constant value entered by admin staff. |
| 15 | Number of capacity units within $WC_{N-1}$ | $C_{N-1}$ | This is a constant value entered by admin staff. |
| 16 | Number of Operations within the WC for a given WO | $O_N$ | This is a constant value based on the WO's Work Flow, or Routing. |
| 17 | Operation Hours per Batch | $O_{HPB}$ | $O_{HPB} = \dfrac{HPU}{O_N} * B$ |
| 18 | Production-hour | | The time unit of production - as opposed to elapsed calendar time. For example, a single-shift operation may only have 8 production-hours in a 24-hour time period. |
| 19 | Production Time | | The calendar time needed to complete a WO, taking into consideration the remaining Production-hours |
| 20 | Pull-Tag | PT | is a work authorization property assigned to a WO. Work may be performed on a WO if, and only if, a PT has been assigned to it and the PT is in a Open state. |
| 21 | $\text{Queue}_N$ Clearance Time | $Q_N$ | The time to clear all WOs in the $WC_N$ queue. |
| 22 | $\text{Queue}_{N-1}$ Clearance time | $t_{Q,N-1}$ | The time to clear all work authorized ahead of $WO_1$ in its queue |
| 23 | Remaining Clear Time at $WC_{N-1}$ for the WO with the least remaining Clear Time | $t_{R,N-1}$ | $t_{C,N-1}$ (Elapsed Processing Time) for the applicable WO |
| 24 | Remaining Clear Time of the WO in process at $WC_N$ with the least remaining Clear Time | $t_{R,N}$ | $(t_{C,N})$ (Elapsed Processing Time) for the applicable WO |

-continued

XV. Table of Definitions

| # | Item Description | Variable | Formula/Explanation |
|---|---|---|---|
| 25 | Remaining Time | | The time remaining until the next WO start into a WC. |
| 26 | Standard Hours per Unit | HPU | This is a property of the WO that varies per WC and represents the total standard process hours per unit for the WC. |
| 27 | Standard Hours for WO1 in $WC_N$ | $W_N$ | The total standard process hours for $WO_1$ in $WC_N$ |
| 28 | Sum of higher-priority WO work times | $\sum_{y=1}^{x-1} t_{WOy,N}$ | This value is related to the anti-starvation test routine. X is the incremented Work Order ordinal value, where X = 1 is the highest-priority WO, X = 2 is the next highest, and so on. $t_{WOy,N}$ is the Clear Time of $WO_y$ in $WC_N$ |
| 29 | Sum of the Start Times at $WC_N$ for all authorized UA WOs | $Y_N$ | The production hours until all currently-authorized UA WOs for $WC_N$ will be started into $WC_N$, thus clearing its queue. |
| 30 | Sum of the Clear Times at $WC_N$ for all authorized UA WOs | | $\sum_{WO=1}^{WO=n} t_{C,N}$ for all authorized UA WOs |
| 31 | Sum of the Clear Times for $WC_N$ of all WO's in its queue. | | $\sum_{WO=1}^{WO=n} t_{C,N}$ for all WOs in the $WC_N$ queue |
| 32 | Sum of the Clear Times for $WC_{N-1}$ for all authorized UA WOs in the $WC_{N-1}$ queue. | | $\sum_{WO=1}^{WO=n} t_{C,N-1}$ for all authorized UA WOs in the $WC_{N-1}$ queue |
| 33 | Throughput Rate | TR | The average production output of a Work Center in Standard Hours per production-hour. |
| 34 | Transit Time for $WO_1$ from $WC_{N-1}$ to $WC_N$ | $t_{T,N-1,N}$ | This is a constant value entered by admin staff. |
| 35 | Unbalanced Line | | a sequence of processing operations, some or all of which requires differing amounts of time to complete. |
| 36 | Upstream Adjacent | UA | refers to a WC that is next prior to a given WC in a Workflow, i.e, $WC_{N-1}$ would be UA to $WC_N$. |
| 37 | $WC_N$ Queue Policy | $X_N$ | $X_N = C_N * \left( t_{WO1,N-1} + t_{T,N-1,N} - t_{R,N} + t_{R,N-1} + \frac{t_{Q,N-1}}{C_{N-1}} \right) + t_{WO1,N}$ |
| 38 | WO Flow Time | $WO_{FT}$ | $WO_{FT} = \left( \frac{\# \text{ Units}}{B} + O_N - 1 \right) * O_{HPB}$ |
| 39 | WO Quantity | $WO_Q$ | Number of Units in a Work Order. This is a property of the WO that is initially provided with the WO details, but may change if defects arise during production. |
| 40 | WO Standard Process Hours | $WO_{SH}$ | For a WO processed as a single batch: $WO_{SH} = HPU * WO_Q$<br>For a serially-split WO: $WO_{SH} = \frac{WO_Q}{B} * O_N * O_{HPB}$ |
| 41 | Work Center | WC | an organization of resources that facilitates the performance of an operation or plurality of operations in a production Workflow. |
| 42 | Work Center N-1 | $WC_{N-1}$ | The Upstream-Adjacent WC in which $WO_1$ is queued. |
| 43 | Work Order | WO | Refers to a set of similar units to be processed as a group at a WC. |
| 44 | Next WO Work Order 1 | $WO_1$ | The WO that is UA, has been assigned the highest priority relative to other UA WOs, and not yet authorized. |
| 45 | Workflow | | Refers to the sequence of defined operations required to convert raw materials into a finished unit. This is also commonly known as a routing. |

What is claimed is:

1. A method for managing time-based demand-pull production of work orders, the method comprising:
   identifying, by a processor at a server, a plurality of connections between the server and a plurality of electronic devices, each of the electronic devices respectively corresponding to one of a plurality of work centers, each of the work centers having a corresponding work order queue; and
   controlling production, by the processor, by authorizing new work orders at the work centers and removing authorization from completed work orders by:
      storing, by the processor, status information from the electronic devices and company databases regarding the state of the work centers, including a subject work center and upstream adjacent work centers, the upstream adjacent work centers being immediately upstream of the subject work center in accordance with one or more workflows associated with one or more work orders in the corresponding work order queues of the work centers, the status information comprising status of work orders for the subject and upstream adjacent work centers, capacities of the subject and upstream adjacent work centers, throughput rates of the subject and upstream adjacent work centers, lead times of the subject and upstream adjacent work centers, work in process of the subject and upstream adjacent work centers, and transit times between the subject and upstream adjacent work centers;
      querying, by the processor, data from a database to identify, from among the work orders, a next work order to be authorized for production at one of the upstream adjacent work centers based on a priority-setting rule, the next work order being currently unauthorized;
      determining, by the processor, a need time comprising an amount of time until the subject work center is available to start work on the next work order in accordance with an amount of time to clear the corresponding work order queue of the subject work center, an amount of time to clear the work orders in transit to the subject work center, and an amount of time to clear authorized work orders of the upstream adjacent work centers;
      determining, by the processor, an arrival time comprising an amount of time until the next work order will arrive at the subject work center, if immediately authorized, in accordance with one or more of:
         (i) an amount of time for the work in process of the upstream adjacent work center in which the next work order is located to drop below a target work in process level by the amount of work represented by the next work order;
         (ii) an amount of time to clear any previously authorized work orders in the corresponding work queue of the upstream adjacent work center in which the next work order is located;
         (iii) an amount of time needed to process the next work order through the upstream adjacent work center in which the next work order is located; and
         (iv) an amount of time to transit the next work order from the upstream adjacent work center in which the next work order is located to the subject work center;
      determining, by the processor, for each work center, in accordance with time-based demand pull authorization, whether the arrival time of the next work order is greater than or equal to the need time of the subject work center;
      transmitting, by the processor, an authorization signal to authorize production of the next work order at the upstream adjacent work center if the arrival time is greater than or equal to the need time of the subject work center;
      modifying, by the processor, the corresponding work order queue of the upstream adjacent work center in which the next work order is located in response to the authorization signal;
      removing the authorization of the next work order when the next work order is completed in the upstream adjacent work center; and
      repeating the controlling step upon a change of state of at least one work center, for repetitively generating signals to dynamically authorize the movement of work orders across multiple work centers.

2. The method of claim 1, further comprising storing, by the processor, data comprising properties of the work orders, properties of a production item of the work orders, properties of a production environment of the work centers, properties of a labor force of the work centers, and transactional data, and
   training a machine learning or artificial intelligence model configured to estimate the arrival time of the next work order and the need time of the subject work center based on the properties.

3. The method of claim 2, further comprising estimating, using the trained machine learning or artificial intelligence model, the arrival time of the next work order and the need time of the subject work center based on the properties.

4. The method of claim 1, further comprising detecting a starvation condition resulting from a significant gap in arrival times of consecutive Work Orders (WOs) by analyzing the arrival times of all WOs upstream of the subject work center sequentially according to their relative priorities.

5. The method of claim 1, wherein the next work order to be authorized for production at one of the upstream adjacent work centers is identified in accordance with being able to be processed by more than one downstream work center among a plurality of downstream work centers.

6. The method of claim 1, further comprising, after removing the authorization of the next work order when the next work order is completed by the upstream adjacent work center, adding the unauthorized next work order to the corresponding work order queue of the subject work center.

* * * * *